(12) United States Patent
Jabaji

(10) Patent No.: US 6,373,230 B2
(45) Date of Patent: Apr. 16, 2002

(54) ALTERNATOR WITH REGULATION OF MULTIPLE VOLTAGE OUTPUTS

(75) Inventor: Issam Jabaji, Morton Grove, IL (US)

(73) Assignee: C. E. Niehoff & Co., Evanston, IL (US)

(*) Notice: Subject to any disclaimer, the term of this patent is extended or adjusted under 35 U.S.C. 154(b) by 0 days.

(21) Appl. No.: 09/833,310

(22) Filed: Apr. 11, 2001

Related U.S. Application Data

(62) Division of application No. 09/464,919, filed on Dec. 16, 1999.

(51) Int. Cl.[7] .................................................. H02P 9/44
(52) U.S. Cl. ...................................... 322/28; 322/90
(58) Field of Search .............................. 322/22, 23, 24, 322/25, 28, 46, 89, 90

(56) References Cited

U.S. PATENT DOCUMENTS

| | | | |
|---|---|---|---|
| 3,793,544 A | 2/1974 | Baumgartner et al. | 320/17 |
| 4,045,718 A | 8/1977 | Gray | 320/17 |
| 4,379,990 A | 4/1983 | Sievers et al. | 322/99 |
| 4,419,619 A | 12/1983 | Jindrick et al. | 323/257 |
| 4,539,486 A | 9/1985 | Saito et al. | 307/34 |
| 4,634,954 A | 1/1987 | Kato et al. | 322/28 |
| 4,636,706 A | 1/1987 | Bowman et al. | 322/28 |
| 4,651,081 A | 3/1987 | Nishimura et al. | 320/64 |
| 4,659,977 A | 4/1987 | Kissel et al. | 320/64 |
| 4,670,705 A | 6/1987 | Sievers et al. | 322/28 |
| 4,682,044 A | 7/1987 | Hotate et al. | 290/40 B |
| 4,692,684 A | 9/1987 | Schaeffer | 322/90 |
| 4,788,486 A | 11/1988 | Mashino et al. | 320/17 |
| 4,789,817 A | 12/1988 | Asakura et al. | 322/28 |
| 4,963,813 A | 10/1990 | Bolle | 320/17 |
| 4,992,951 A | 2/1991 | Glowczewski et al. | 364/483 |
| 4,999,563 A | 3/1991 | Suzuki | 322/90 |
| 5,006,781 A | 4/1991 | Schultz et al. | 322/25 |

(List continued on next page.)

Primary Examiner—Nicholas Ponomarenko
(74) Attorney, Agent, or Firm—Brinks Hofer Gilson & Lione

(57) ABSTRACT

An alternator generates output power at two or more independent voltages. The alternator has two independent output windings configured to generate the power needed for each output. Each output voltage is sensed by a regulator that controls switching rectifiers to supply the current needed to satisfy the electric power demand of the loads connected to each output. After both output load demands are satisfied, the regulator switches off the alternator field. When power demand from either load rises, the alternator field is switched on along with the respective switching rectifier to satisfy the power demand. The output voltage grounds and control signals may be electrically isolated from each other.

11 Claims, 11 Drawing Sheets

U.S. PATENT DOCUMENTS

| | | | |
|---|---|---|---|
| 5,023,539 A | 6/1991 | Miller et al. | 322/28 |
| 5,033,565 A | 7/1991 | Abukawa et al. | 180/79.1 |
| 5,151,641 A | 9/1992 | Shamoto | 318/762 |
| 5,168,208 A | 12/1992 | Schultz et al. | 322/25 |
| 5,210,480 A | 5/1993 | Iwatani et al. | 322/28 |
| 5,214,371 A * | 5/1993 | Naidu | 322/29 |
| 5,216,350 A | 6/1993 | Judge et al. | 322/25 |
| 5,225,764 A | 7/1993 | Falater | 322/28 |
| 5,254,935 A | 10/1993 | Vercesi et al. | 322/29 |
| 5,260,641 A | 11/1993 | Iwatani | 322/28 |
| 5,262,711 A | 11/1993 | Mori et al. | 322/28 |
| 5,272,614 A | 12/1993 | Brunk et al. | 363/21 |
| 5,274,322 A | 12/1993 | Hayashi et al. | 322/32 |
| 5,281,905 A | 1/1994 | Dhyanchand et al. | 322/90 |
| 5,294,879 A | 3/1994 | Freeman et al. | 322/23 |
| 5,300,876 A | 4/1994 | Takagi | 322/38 |
| 5,323,102 A | 6/1994 | Torii et al. | 322/90 |
| 5,390,068 A | 2/1995 | Schultz et al. | 361/95 |
| 5,418,401 A | 5/1995 | Kaneyuki | 307/10.1 |
| 5,491,404 A | 2/1996 | Settles et al. | 323/283 |
| 5,512,813 A | 4/1996 | Uchinami | 322/28 |
| 5,521,485 A | 5/1996 | Vogelsberger | 322/28 |
| 5,559,704 A | 9/1996 | Vanek et al. | 364/431.1 |
| 5,581,172 A | 12/1996 | Iwatani et al. | 322/28 |
| 5,583,420 A | 12/1996 | Rice et al. | 322/25 |
| 5,606,244 A | 2/1997 | Migdal | 322/7 |
| 5,712,786 A | 1/1998 | Ueda | 364/431.7 |
| 5,739,677 A | 4/1998 | Tsutsui et al. | 322/25 |
| 5,907,233 A | 5/1999 | Jabaji | 322/28 |
| 6,275,012 B1 * | 8/2001 | Jabaji | 322/22 |

* cited by examiner

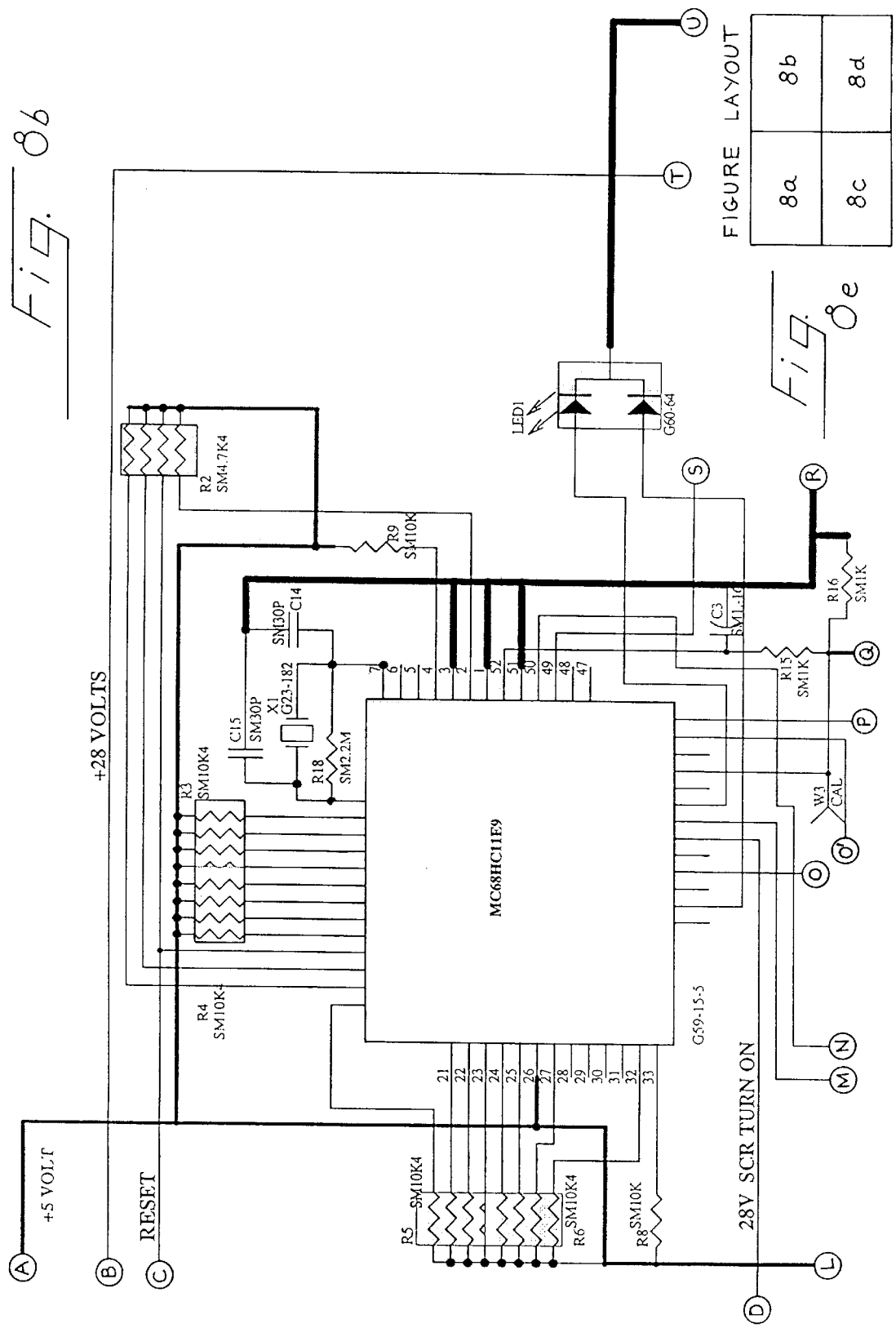

ALTERNATOR WITH REGULATION OF MULTIPLE VOLTAGE OUTPUTS

This application is a division of application Ser. No. 09/464,919, filed Dec. 16, 1999, (pending), which is hereby incorporated by reference herein.

REFERENCE TO APPENDIX

This specification includes an appendix A (pages i-xxxiii), which includes a listing of a computer program included in the preferred embodiment described below. Appendix A is provided on a compact disc containing the file AD20P.TXT (46Kbytes, created Oct. 9, 2001), which file is hereby incorporated by reference. This Appendix includes copyrighted subject matter, and the assignee of the present invention retains all copyright rights, other than the right to reproduce the Appendix as a portion of the attached specification.

BACKGROUND

This invention relates to an electrical generator such as an alternator that is capable of providing current at two separate voltages.

A modern vehicle uses an alternator to power the vehicle's electrical system and to recharge a battery that provides standby electric power whenever the vehicle engine is not operating or when insufficient electric power is available from the alternator. The alternator includes a field winding, stator windings, and a rotating shaft that is driven through some arrangement by an engine. Rectifiers are used to convert the alternating current generated by the stator windings into direct current for battery charging and other electric loads. A voltage regulator senses the alternator output voltage and controls the field coil current to maintain a constant voltage according to the regulator's internal voltage reference as external electric loads are added and removed, within the limits of the alternator output power capacity. This is generally achieved by causing current to flow through the field winding whenever output voltage drops below the reference voltage, and stopping the flow of current through the field winding whenever the output voltage rises above the reference voltage.

The appropriate regulator reference voltage is determined by the battery charging voltage needed for the particular application, and the vehicle electrical system typically is designed to operate at this voltage. The reference voltage is often designed with temperature compensation because it is desirable for battery charging that the charging voltage decrease as battery temperature increases. Alternator output current is produced in the stator windings when the field winding is conducting current and the alternator shaft is turning.

Some vehicles that employ traction motors to drive the vehicle also use conventional automotive electrical systems for lighting and electronic systems that operate at either 14 volts or 28 volts. The electric power for the traction motors is typically derived from a main generator driven by an internal combustion engine. Battery power at 84 volts is typically used to crank the internal combustion engine and to activate the main generator field. During normal operation, electric power at either 14 volts or 28 volts is needed to power the automotive electrical system, and electric power at 84 volts is needed to keep the engine-cranking batteries fully charged.

Prior art dual voltage alternators often provide 14 volt and 28 volt output, because these two voltages are most commonly found in automotive electrical systems. These systems typically employ a common stator powered by a field coil to generate the output power for two voltages that share a common ground. As an example of a typical arrangement, the field coil is controlled in response to the 28 volt output only, with no rectifier control on the 28 volt supply, and the 14 volt supply is controlled via a switched rectifier such as a silicon controlled rectifier (SCR).

A potential disadvantage of this common stator arrangement is that output power at the higher voltage output (e.g. 28 volts) may not be available at low shaft speeds. This output power disparity at low shaft speeds may be acceptable if there is not a significant difference between the two output voltages, and if output power at both voltages is available at the lowest normal operating shaft speed. However, as the two output voltages diverge and the difference between them increases in magnitude (e.g. 28 volts−14 volts=14 volts, while 84 volts−28 volts=56 volts), output at the higher voltage may not be available except at a high alternator shaft speed. For example, an engine-driven common stator alternator operating at engine idle speed may have some 28 volt output current, but no 84 volt output current, unless the engine speed is significantly increased.

It is not apparent that anyone has addressed all of the above problems in an alternator or voltage regulator design. However, various systems have been proposed which touch upon some aspects of the above problems. For example, Mashino, et al., U.S. Pat. No. 4,788,486, proposes a vehicular power supply system that includes a field winding that generates a rotating magnetic field to induce alternating current (AC) voltages in a pair of sets of armature windings sharing a common ground. The AC voltages of the armature windings are converted by two groups of rectifiers to respective DC voltages that in turn charge a pair of batteries in series. A first voltage regulator controls the current of the field winding to regulate the first battery voltage. A second voltage regulator regulates the second battery voltage by connecting and disconnecting the second battery from a group of rectifiers. Mashino does not disclose independent switching or control of the groups of rectifiers. Neither the second voltage regulator nor the second battery appears to have any effect on the field winding, which is initially excited and is thereafter self-excited and modulated according to the value of the first battery.

Abukawa, et al., U.S. Pat. No. 5,033,565, proposes a generator that generates two voltage outputs. A field winding, responsive to a predetermined exciting current supplied from a voltage regulator, induces three-phase AC voltages in a pair of armature windings. First and second DC voltages are generated at a pair of output terminals from the AC voltages by two groups of rectifiers. Abukawa, et al., does not consider voltage regulation schemes beyond supplying a predetermined exciting current. Neither group of rectifiers is controlled by the voltage regulator, which is not illustrated. The armature windings are shown to be in mechanically close proximity around a drive shaft in FIG. 2 of Abukawa, and appear to be of the common ground variety. The DC output voltages appear to be commonly grounded in all pictorial embodiments of the generator.

Baumgartner, et al., U.S. Pat. No. 5,033,565, proposes a generator that employs a pair of identically designed stators wound in mechanically close proximity to attempt to generate two identical voltage outputs. A field winding supplies the alternator field. A generally conventional voltage regulator maintains the proper excitation voltage across the field winding at engine speed above low idle for AC outputs from the stators that will provide DC outputs that are as equivalent to each other as possible in response to balance and unbalanced loads. It appears to be a design goal that the DC voltage outputs be maintained essentially identical in magnitude, and that the stators be identical in size and function. The voltage regulator controls neither group of rectifiers.

SUMMARY

A need presently exists for an electrical generator system (such as an alternator) that is capable of generating electrical output at two independently controlled output voltages. Preferably, this generator is capable of independently controlling output voltages that are significantly different in magnitude. Preferably, the generator provides the independently controlled output voltages over a wide range of alternator shaft speeds, over a wide range of electrical loads, and over a wide range of ambient temperature. Preferably, the generator communicates with other systems to share status information and to take action needed to meet the application operating requirements. Preferably, a more complete diagnostic indication of the state of the generator is provided.

In one aspect, a multiple voltage electrical generator includes a field source, first and second switched rectifiers, a first power generating winding, and a second power generating winding. The first power generating winding is coupled with a first output via the first switched rectifier. The second power generating winding is coupled with a second output via the second switched rectifier. The first output and the first power generating winding are electrically isolated from the second output and the second power generating winding.

In another aspect, a multiple voltage electrical generator includes a field source, first and second switched rectifiers, a first power generating winding, and a second power generating winding. The field source includes opposed first and second sides separated axially along a drive shaft. The first power generating winding is disposed on the first side of the field source, and is coupled with a first output via the first switched rectifier. The second power generating winding is disposed on the second side of the field source, and is coupled with a second output via the second switched rectifier. The first output and the first power generating winding are electrically isolated from the second output and the second power generating winding.

In another aspect, a multiple voltage electrical generator includes a field source, first and second switched rectifiers, a first power generating winding, and a second power generating winding. The field source includes first and second sides spaced along an axis. The first power generating winding has a center of mass disposed nearer the first side than the second side of the field source. The first power generating winding is coupled with a first output via the first switched rectifier. The second power generating winding has a center of mass disposed nearer the second side than the first side of the field source. The second power generating winding is coupled with a second output via the second switched rectifier. The first output and the first power generating winding are electrically isolated from the second output and the second power generating winding.

In another aspect, a method for regulating an electrical generator is presented. The electrical generator includes a field source and first and second power generating windings. The first and second power generating windings supply current at first and second outputs, respectively. Current is conducted between the first power generating winding and the first output when the first output voltage falls below a first threshold. Current is conducted between the second power generating winding and the second output when the second output voltage falls below a second threshold. Current is increased through the field source when either one of the first and second output voltages falls below the respective threshold.

In another aspect, a method for regulating an electrical generator is presented. The electrical generator includes a field source and first and second power generating windings. The first and second power generating windings supply current at first and second outputs, respectively. Current is conducted between the first power generating winding and the first output when the first output voltage falls below a first threshold. Current is conducted between the second power generating winding and the second output when the second output voltage falls below a second threshold. Current is decreased through the field source when (1) the first output voltage exceeds the first threshold and (2) the second output voltage exceeds the second threshold.

In another aspect, a multiple voltage electrical generator includes a field source, first and second power generating windings, and a voltage regulator. The first and second power generating windings supply current at respective first and second outputs. The voltage regulator includes a first means for conducting current between the first power generating winding and the first output when the first output voltage falls below a first threshold. The voltage regulator further includes a second means for conducting current between the second power generating winding and the second output when the second output voltage falls below a second threshold. The voltage regulator also includes a means for increasing current through the field source when either one of the first and second output voltages falls below the respective threshold and for decreasing current through the field source when both of the first and second output voltages exceed the respective threshold.

The foregoing paragraphs have been provided by way of introduction, and are not intended to limit the scope of the following claims.

BRIEF DESCRIPTION OF THE DRAWINGS

The accompanying drawings constitute part of this specification and serve to explain further selected embodiments of this invention.

FIGS. 8a–8e are a schematic diagram useful in applying the listing the Appendix A.

DESCRIPTION OF THE PRESENTLY PREFERRED EMBODIMENTS

Figure 1:
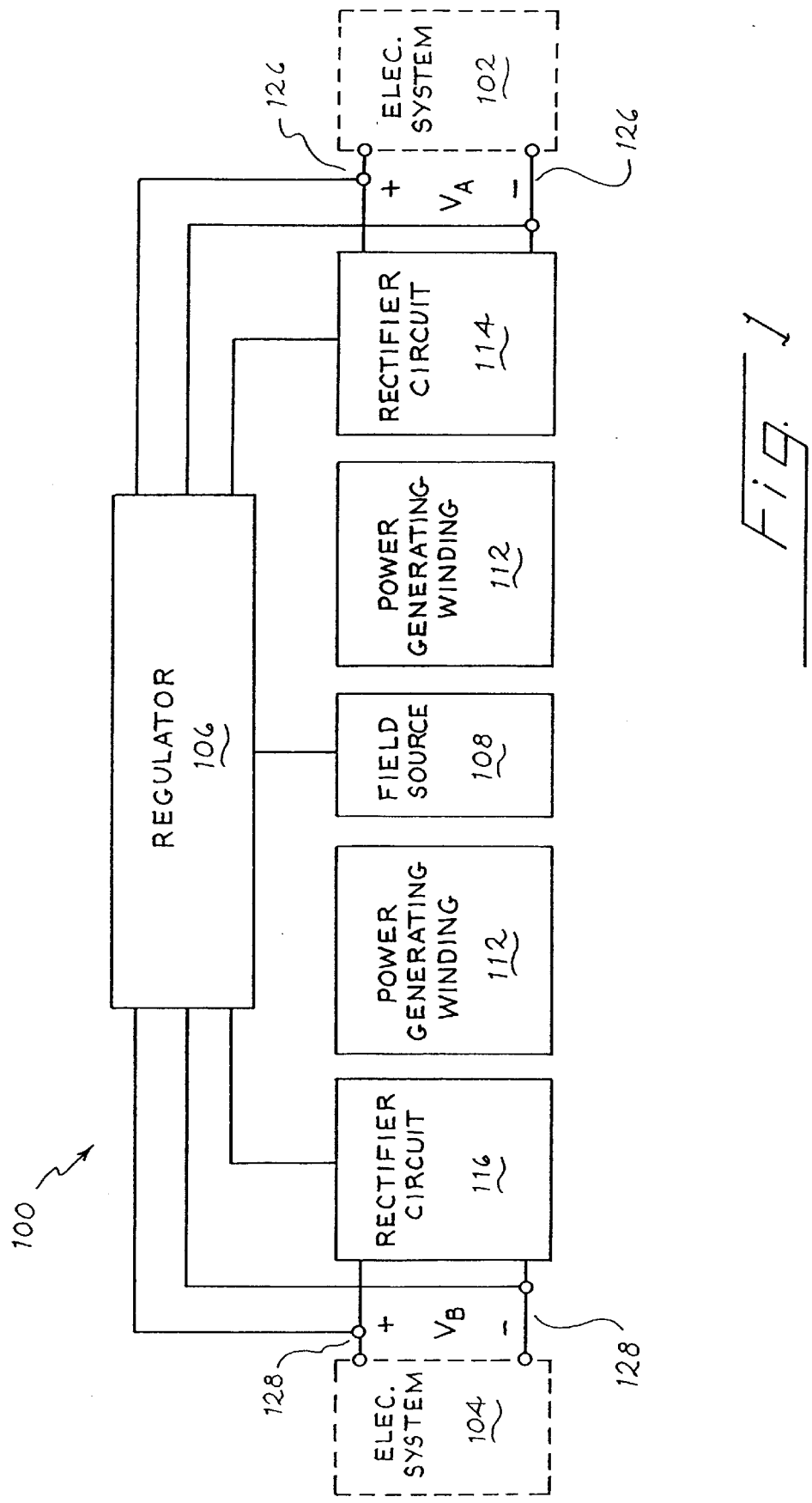
FIG. 1 is a block diagram of an electrical generator such as an alternator according to a preferred embodiment of the present invention.

Turning now to the drawings, FIG. 1 is a block diagram of an alternator 100 that operates in accordance with this invention. The alternator 100 supplies output power to a first electrical system 102 operating at a first voltage $V_A$ and to a second electrical system 104 operating at a second voltage $V_B$. Preferably, the second electrical system 104 is electrically isolated from the first electrical system 102, and the voltage $V_A$ does not share a common ground with the voltage $V_B$. The alternator 100 includes a regulator 106 that is coupled with and preferably controls a field source 108. In a preferred embodiment, the regulator 106 is mounted separately from the alternator 100. A first power generating winding 110 and a second power generating winding 112 are located in sufficient proximity to the field source 108 such that the field source 108 is capable of inducing voltages at the first and second power generating windings 110, 112 under regular performance conditions of the alternator 100. Preferably, the respective voltages induced at the first and second power generating windings 110, 112 are fed back to the regulator 106. The first power generating winding 110 is coupled to a first rectifier circuit 114, and the second power generating winding 112 is coupled to a second rectifier circuit 116.

Preferably, the first rectifier circuit 114 includes a pair of first output terminals (representing a first output 126 of the alternator 100) that is coupled to the first electrical system 102, such that the first power generating winding 110 is coupled to the pair of output terminals (the first output 126) via the first rectifier circuit 114. Preferably, the second rectifier circuit 116 includes a pair of second output terminals (representing a second output 128 of the alternator 100) that is coupled to the second electrical system 104, such that the second power generating winding 112 is coupled to the pair of output terminals (the second output 128) via the second rectifier circuit 116. In other embodiments, the first rectifier circuit 114 and the second rectifier circuit 116 can be connected and disconnected to the respective first and second electrical systems 102, 104 by respective switches (not shown) external to the regulator 106. Preferably, the first and second outputs 126, 128 are electrically isolated from one another and do not share a common ground.

The regulator 106 is preferably coupled to and preferably controls the first rectifier circuit 114 via one or more control lines that feed into one or more respective control terminals included at the first rectifier circuit 114. The regulator 106 is preferably coupled to and preferably controls the second rectifier circuit 116 via one or more control lines that feed into one or more respective control terminals included at the second rectifier circuit 116. Preferably, the first and second control terminals are electrically isolated from one another. In a presently preferred embodiment, each control terminal is coupled with the trigger input of a respective silicon-controlled rectifier (SCR).

The regulator 106 controls the supply of output power to the first and second electrical systems 102, 104. Preferably, the regulator 106 controls the supply of output power in order to regulate and maintain the voltages $V_A$ and $V_B$ at stable values. Preferably, the regulator 106 includes first and second internal voltage references or thresholds $V_{AREF}$ and $V_{BREF}$. Preferably, the voltage $V_A$ is fed back to the regulator 106 and is compared with the internal voltage reference $V_{AREF}$. In a preferred embodiment, the regulator 106 modulates a control signal to control the first rectifier circuit 114 according to the result of the comparison with the internal voltage reference $V_{AREF}$. Preferably, the voltage $V_B$ is fed back to the regulator 106 and is compared with the internal voltage reference $V_{BREF}$. In a preferred embodiment, the regulator 106 modulates a control signal to control the second rectifier circuit 116 according to the result of the comparison with the internal voltage reference $V_{BREF}$.

Preferably, the first and second rectifier circuits 114, 116 operate as switched rectifier circuits. Preferably, the first and second rectifier circuits 114, 116 respectively include one or more switched rectifiers that are responsive to one or more control signals from the regulator 106. In this way, the regulator 106 can independently control the respective output current and thus independently regulate each voltage $V_A$ and $V_B$. Preferably, SCRs are utilized in the first and second rectifier circuits 114, 116 to perform switched rectification of AC voltages.

Preferably, the field source 108 is excited by the regulator 106 and generates a magnetic field. The term excite is used broadly to encompass any method for passing current through the field source 108, which may be a field winding or a field coil, for example. In a preferred embodiment, an end of the field source 108 receives an applied voltage to energize the field source 108, while the regulator 106 is coupled to another end of the field source 108 and controls the current through the field source 108, thus exciting the field source 108. In a presently preferred embodiment, the regulator 106 controls the excitation of the field source 108 by modulating a control signal. Preferably, the field source 108 may be turned on or off by the regulator 106 to aid in controlling the output power of the alternator 100. In other embodiments, the field source 108 remains on at all times when the alternator 100 is turned on, and the regulator 106 uses other approaches or mechanisms, such as controlling the first and second rectifier circuits 114, 116 to control the output power of the alternator 100. In other embodiments, the field source 108 can be self-excited once initially energized.

Generally, the purpose of the field source 108 is to produce magnetic flux to induce voltages in the first and second power generating windings 110, 112. The field source 108 can be implemented in a myriad of ways to accomplish this purpose. The field source 108 can be implemented in coiled or wound embodiments. In a preferred embodiment, the field source 108 is a field winding. The field source 108 can be formed as a bobbin winding, for example. The field source 108 may also include a winding with wave-shaped turns. Also, the field source 108 is not limited to a field winding or a field coil. For example, in another embodiment, a permanent magnet is utilized as the field source 108 to produce magnetic flux.

In a preferred embodiment, the field source 108 includes a stationary field winding that does not spin or rotate. However, in other embodiments, the field source 108 includes a field winding that rotates with a drive shaft to generate a rotating magnetic field. Most broadly, the field source 108 can remain stationary, rotate about an axis including its own center of mass, or spin or rotate around another axis, as appropriate for the application.

In a preferred embodiment, the first and second power generating windings 110 and 112 are each implemented as a group of stator windings. Preferably, each respective group of stator windings is implemented as a three-phase winding known to those skilled in the art as the Wye configuration, although other configurations or phases are possible, such as the three-phase Delta configuration. Preferably, the first power generating winding 110 is electrically isolated from the second power generating winding 112. Preferably, the first power generating winding 110 does not share a common ground with the second power generating winding 112.

The power generating windings 110, 112 such as stator windings preferably remain stationary relative to the drive shaft. However, it should be understood that the embodiments contemplated are not limited to stationary windings. In other electrical generator embodiments the windings can be mounted for rotation.

Each group of stator windings may be wound on metal laminations and be used in combination with one or more rotors. As is known to those skilled in the art, a rotor is the rotating part of an electrical generator. Preferably, each group of stator windings has its own associated rotor.

Although in a presently preferred embodiment, the first and second power generating windings 110, 112 are implemented as stator windings with induced voltages from a field winding 108, other implementations exist. In an exemplary permanent magnet embodiment, the field source 108 is implemented as a permanent magnet and acts as a magnetic field source. When utilizing a permanent magnet as the field source 108 for the first and second windings 110, 112, shielding may be used. Preferably, a shield is utilized to isolate the first and second windings 110, 112 from each other to reduce or eliminate cross-coupling. A non-magnetic material can also be utilized to reduce or eliminate cross-coupling. The first and second power generating windings 110, 112 can be implemented on a single rotor or a separate rotor can be utilized for each of the first and second windings 110, 112.

The magnetic field generated by the field source 108 preferably induces voltages at the first and second power generating windings 110, 112. The induced voltages at the first and second windings 110, 112 will in general be AC voltage signals. In the case of stator windings, the relative magnitude of the induced voltages at the first power generating windings 110, 112 will in general depend on the relative number of turns of the windings in the first and second power generating windings 110, 112. The output power derived from the groups of stator windings is generally dependent on the wire gauge that is utilized, the number of turns, and the materials used to form the stator (typically iron, copper, and steel). Utilizing electrically and physically independent groups of stator windings allows individual optimization of each stator with regard to the output power generation desired in particular applications. This individual optimization of the stators includes designing for the optimal wire gauge, number of turns, physical size, lamination and rotor relationship, and increasing or decreasing the relative amounts of materials utilized in forming the stator.

Physical independence of the stators has implications for the physical placement of the stators relative to each other. In a preferred embodiment, the stators do not overlap each other. In this way cross-coupling is reduced. In a presently preferred embodiment, the stators are physically separated along the axis defined by the drive shaft of the alternator 100. More broadly, axial separation of the stators is broadly intended to refer to any arrangement of the stators that avoids complete overlap of the stators. Most broadly, the first and second power generating windings 110, 112 are implemented such that magnetic coupling, cross coupling, or other mutual coupling effects between the windings 110, 112 are avoided or reduced to the extent tolerated in a given application.

Figure 2:
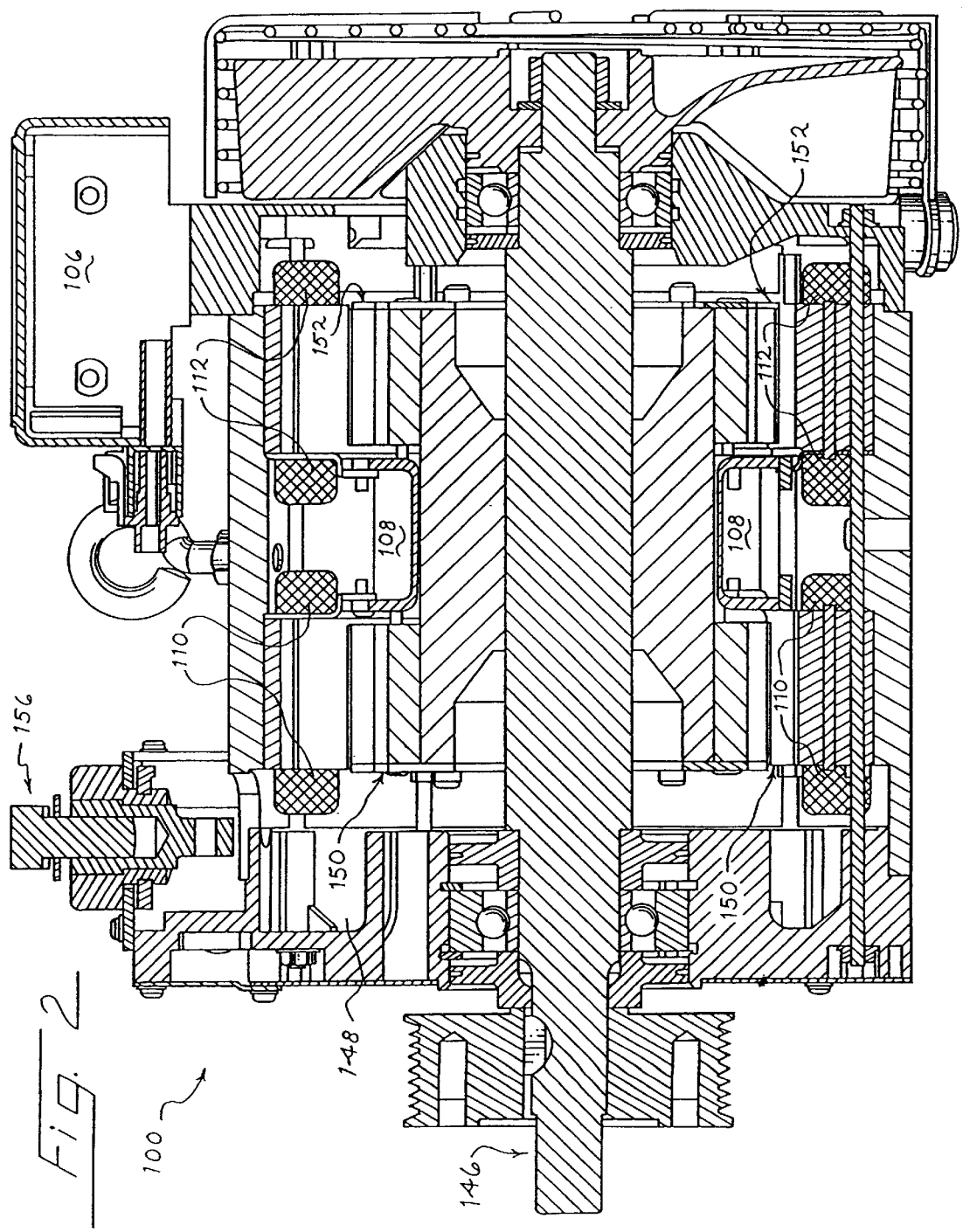
FIG. 2 is cross-sectional view of an exemplary alternator embodiment.
Figure 3:
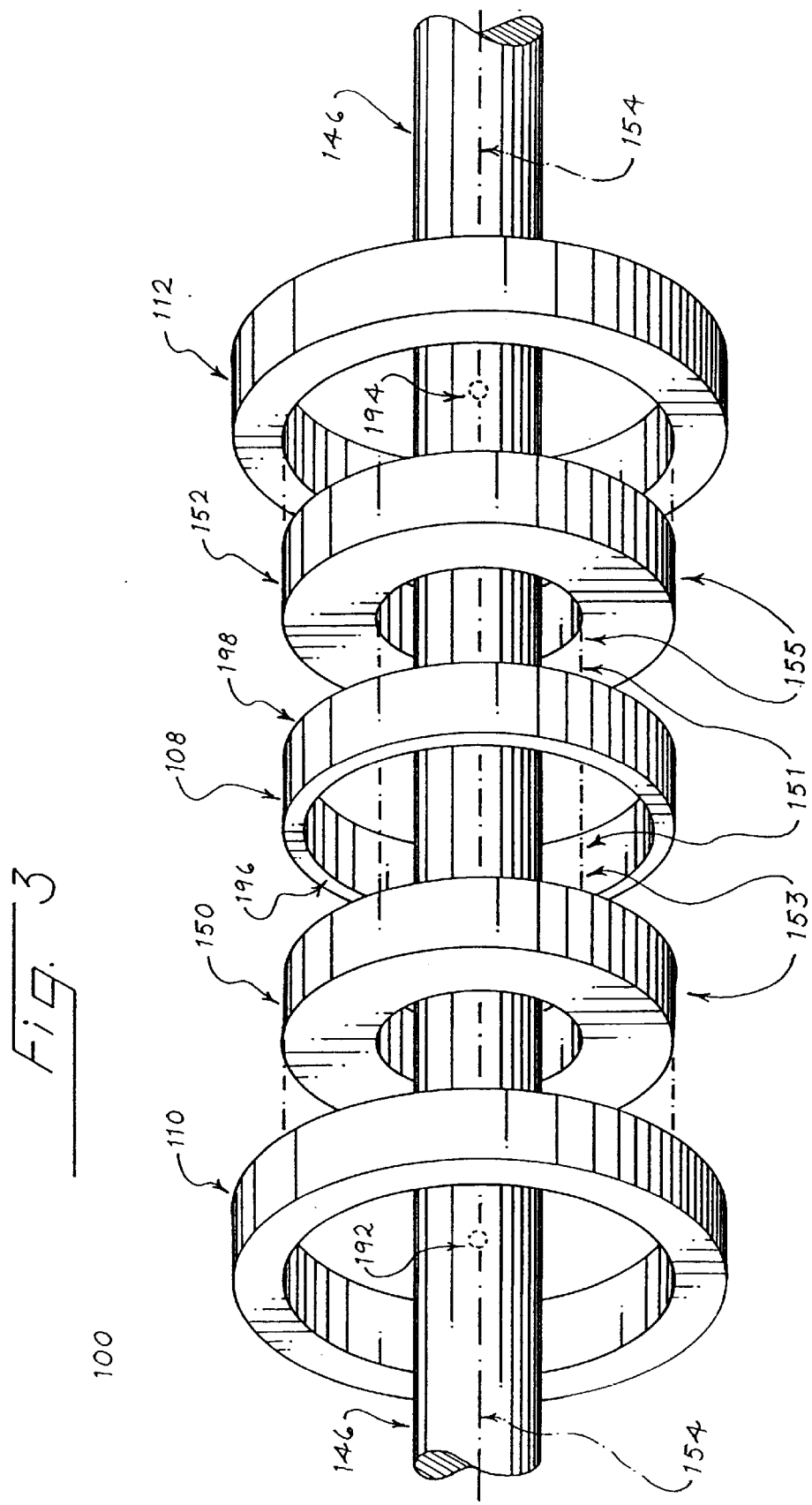
FIG. 3 is a simplified three-dimensional view of several elements of the embodiment of FIG. 2.

FIG. 2 is a cross-sectional view of a presently preferred dual-voltage embodiment of the alternator 100 that operates in accordance with this invention. FIG. 3 is a simplified three-dimensional view of the embodiment of FIG. 2. The alternator 100 includes the drive shaft 146, the first and second rectifier circuits 114, 116 within a housing 148, first and second rotors 150, 152, first and second stator windings 110, 112, a field winding 108, four output studs 156 (one of which is shown in FIG. 2) and the regulator 106. In FIG. 2, the regulator 106 is mounted separately from the alternator 100. The field winding 108 is looped circumferentially around the drive shaft 146 and is mounted such that the field winding 108 is stationary during normal operation. As can be seen in FIGS. 2 and 3, the first and second stator windings 110, 112 do not overlap and are axially separated along the drive shaft 146. The first and second stator windings 110, 112 are disposed or positioned on either side of the field winding 108. In this embodiment, the field winding 108 and the first and second stator windings 110, 112 are stationary, while the first and second rotors 150, 152 rotate or spin with the drive shaft 146 when the drive shaft 146 is turning. Preferably, the stator windings 110 and 112 are electrically isolated and do not share a common ground.

In FIG. 3, the drive shaft 146 is illustrated as parallel to an axis 154. The field winding 108 has opposing first and second sides 196, 198 separated axially along the drive shaft 146. The first and second stator windings 110, 112 have respective centers of mass 192, 194 shown in FIG. 3. For simplicity of illustration, the first and second stator windings 110, 112 are of uniform volume and mass and are perfectly radially aligned along the drive shaft 146 and the axis 154. Thus, the centers of mass 192, 194 are located on the axis 154 at the centers of the first and second stator windings 110, 112, respectively. In preferred embodiments of the alternator 100, the center of mass 192 of the stator winding 110 is disposed nearer the first side 196 than the second side 198 of the field winding 108. The first stator winding 110 can also be disposed entirely on the first side 196 of the field winding 108. In preferred embodiments of the alternator 100, the center of mass 194 of the second stator winding 112 is disposed nearer the second side 198 than the first side 196 of the field winding 108. The second stator winding 112 can also be disposed entirely on the second side 198 of the field winding 108, opposed to the first side 196.

The alternator 100 preferably includes the rotors 150, 152. However, in other embodiments, a single rotor 151 (part of an exemplary rotor is illustrated with dashed lines in FIG. 3) may be used. Preferably, the rotor 151 includes a first portion 153 on the first side 196 of the field winding 108 and a second portion 155 on the second side 198 of the field winding 108 opposed to the first side 196. Preferably, the first portion 153 has a greater effect than the second portion 155 on magnetic coupling between the field winding 108 and the first stator winding 110. Preferably, the second portion 155 has a greater effect than the first portion 153 on magnetic coupling between the field winding 108 and the second power generating winding 112. It should be understood that in some embodiments the first and second portions 153, 155 of the rotor 151 can refer to two physically distinct and separate rotors, while in other embodiments one rotor is utilized.

Generally, an element such as a winding is said to be on one side of another element such as a winding whether the two elements are radially aligned or radially offset with respect to the longitudinal axis.

Figure 4:
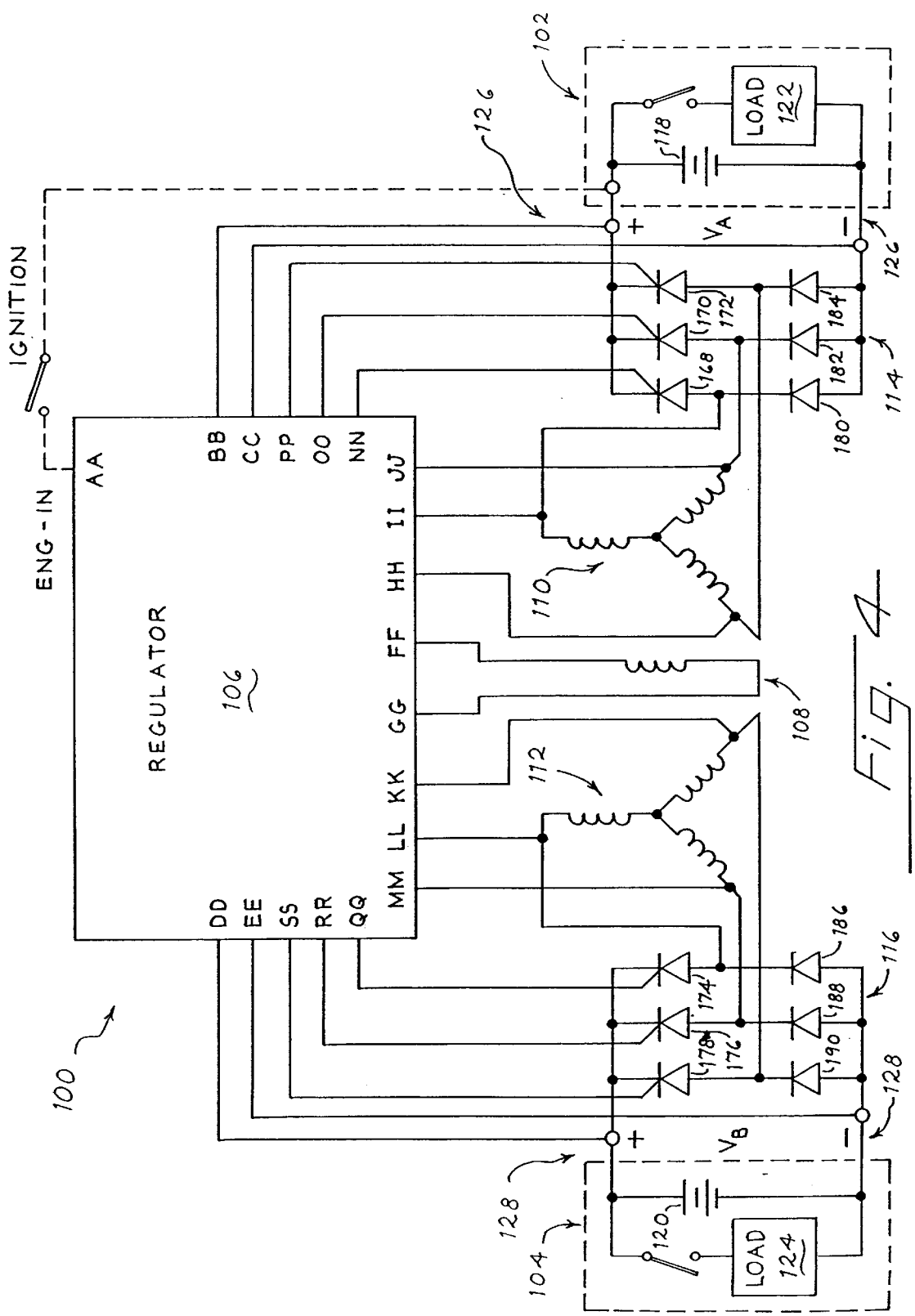
FIG. 4 is a block diagram of the embodiment of FIG. 2.

FIG. 4 is a block diagram of a more detailed embodiment of the alternator 100 that operates in accordance with this invention. The alternator 100 includes the regulator 106, a presently preferred version of which is illustrated in more detail in FIG. 5 and is described in more detail below. In a preferred embodiment, the regulator 106 is mounted separately from the alternator 100. The alternator 100 of FIG. 4 further includes a field winding 108, first and second stator windings 110, 111, and first and second rectifier circuits 114, 116, all preferably coupled to the regulator 106 at pins FF through SS.

The first rectifier circuit 114 includes a pair of first output terminals (representing a first output 126 of the alternator 100) that is coupled to a first electrical system 102. The second rectifier circuit 114 includes a pair of second output terminals (representing a second output 128 of the alternator 100) that is coupled to a second electrical system 102. Preferably, the first and second outputs 126, 128 are electrically isolated from one another and do not share a common ground.

The first and second electrical systems 102, 104 are illustrated as external to the alternator 100, but in other embodiments part or all of the first or second electrical systems 102, 104 can be included in the alternator 100. The first and second electrical systems 102, 104 of FIG. 4 include respective first and second direct current electric power busses or batteries 118, 120 and can include respective first and second switched electrical loads 122, 124. The first and second batteries 118, 120 preferably provide power to the first and second switched loads 122, 124 (or other loads, not shown), respectively, when the switches are closed. The first and second batteries 118, 120 have respective DC output voltages of $V_A$ and $V_B$.

In a presently preferred embodiment, the first battery 118 has a nominal charging value of around +28 volts (i.e. $V_A=+28$ volts), while the second battery 120 has a nominal charging value of around +84 volts (i.e. $V_B=+84$ volts).

Although the first and second batteries 118, 120 may be referred to in this and other areas of the specification as having respective nominal values of +28 V and +84 V, the voltages $V_A$ and $V_B$ are not limited to these values and other voltages, or other batteries, may be used. It should also be understood that the value of the first and second batteries 118, 120 voltages will generally vary as loads are added or removed or as the batteries 118, 120 are overcharged or undercharged. Preferably, one purpose of the regulator 106 is to maintain the respective voltages $V_A$ and $V_B$ at relatively stable values.

During normal operation, the alternator 100 of FIG. 4 is controlled by the regulator 106. The regulator 106 preferably controls the current through the field winding 108 via a first internally generated control signal 162 (shown in FIG. 5) to produce a magnetic field to induce AC voltages on the first and second stator windings 110, 112. The first control signal 162 can be either an analog or a digital control signal, depending on the embodiment of regulator 106 that is employed. Preferably, the first and second stator windings 110, 112 are each implemented in a three-phase Wye configuration as illustrated in FIG. 4. Preferably, the first and second stator windings 110, 112 do not share a common ground and are electrically as well as physically isolated from one another to avoid cross-coupling or similar mutual effects.

The AC phase voltages of the second stator windings 112 are input to the regulator 106 at respective pins KK, LL, and MM. The AC phase voltage outputs of the second stator windings 112 are also each coupled to a respective switched rectifier of the second rectifier circuit 116. The second rectifier circuit 116 includes three SCRs 174, 176, 178 and three diodes 186, 188, 190. The SCRs 174, 176, 178 are configured to receive respective trigger signals from the regulator 106. The trigger signal preferably switches the SCR on and off, thus controlling conduction of the SCR and rectification of the AC phase voltage of the second stator windings 112. In this way, the regulator 106 controls the current to the second battery 120 and thus the output voltage $V_B$ of the second battery 120. The regulator 106 preferably controls the trigger signals at pins QQ, RR, and SS to the SCRs 174, 176, 178 of the second rectifier circuit 116 via a second internally generated control signal 164 (shown in FIG. 5). The second control signal 164 can be either an analog or a digital control signal, depending on the embodiment of regulator 106 that is employed.

Each of the AC phase voltages of the first stator windings 110 are input to the regulator 106 at respective pins HH, II, and JJ. The AC phase voltage outputs of the first stator windings 110 are also each coupled to a respective switched rectifier of the first rectifier circuit 114. The first rectifier circuit 114 includes three SCRs 168, 170, 172 and three diodes 180, 182, 184. The SCRs 168, 170, 172 are configured to receive respective trigger signals from the regulator 106. The trigger signal preferably switches the SCR on and off, thus controlling conduction of the SCR and rectification of the AC phase voltage of the first stator windings 110. In this way, the regulator 106 controls the current to the first battery 118 and thus the output voltage $V_A$ of the first battery 118. The regulator 106 preferably controls the trigger signals at pins NN, OO, and PP to the SCRs 168, 170, 172 of the rectifier circuit 114 via a third internally generated control signal 166 (shown in FIG. 5). The third control signal 166 can be either an analog or a digital control signal, depending on the embodiment of regulator 106 that is employed.

Figure 5:
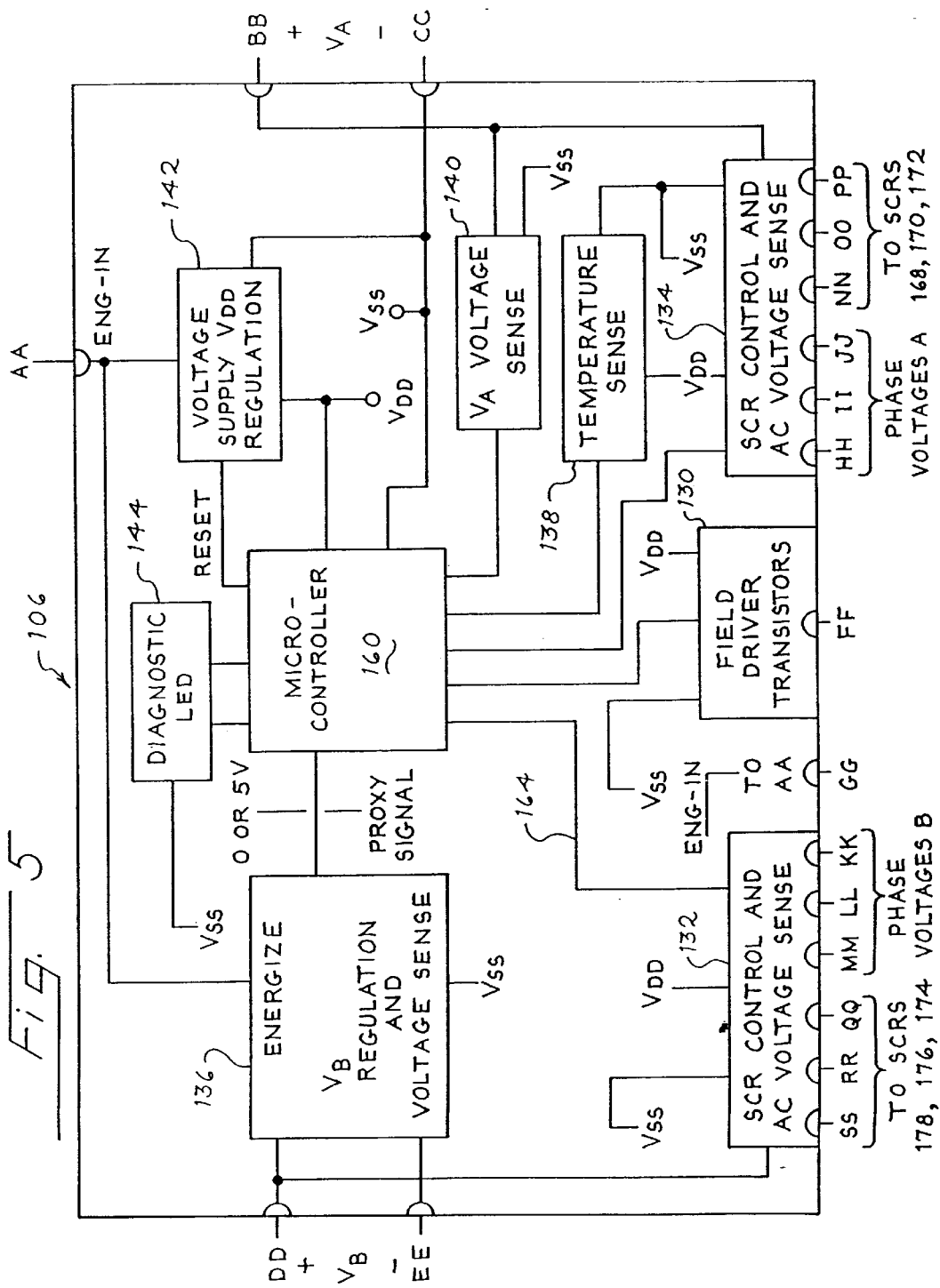
FIG. 5 is a block diagram of an exemplary embodiment of a regulator suitable for use in the alternator of FIG. 4.

FIG. 5 provides a block diagram of a presently preferred embodiment of the regulator 106 that operates in accordance with this invention. The regulator 106 includes a micro-controller 160, a field driver transistors circuit 130, a first SCR control and AC voltage sense circuit 134, a second SCR control and AC voltage sense circuit 132, a temperature sense circuit 138, a $V_A$ voltage sense circuit 140, a voltage supply $V_{DD}$ regulation circuit 142, a $V_B$ regulation and voltage sense circuit 136, and a diagnostic light emitting diode (LED) circuit 144.

The micro-controller 160 of regulator 106 executes a set of software routines at a rate determined by a clock signal generated by a clock. The micro-controller 160 includes a digital signal processor, an analog-to-digital converter, and suitable memories. A variety of micro-controllers may be used. For example, the micro-controller offered by Motorola as Part No. MC 68HC11 has been found suitable.

The regulator 106 as depicted in FIG. 5 has been adapted for use with the alternator 100 shown in FIG. 4. The connector pins are designated AA through SS. There are therefore nineteen input or output pins illustrated on the regulator 106, the same as depicted in FIG. 4. Three of the nineteen signals are essentially derived from the same signal during normal operation so that the regulator 106 is preferably implemented with seventeen input or output pins. The nineteen signals and the nineteen pins as well as the circuits of the regulator 106 are described as follows:

AA (Eng-in) represents the energize signal, which is operated to bring the regulator 106 into operation and to initialize and supply power to the micro-controller 160. The energize signal is preferably derived from the first battery 118 and passes through a variety of control switches (illustrated as an open switch in FIG. 4) before it arrives at the designated regulator pin. In a presently preferred embodiment, the first battery 118 has a nominal value of 28 volts. Of course, the first battery 118 is not limited to this value and other voltages may be used. The state of the energize signal may selected by an ignition switch (IGNITION in FIG. 4) or a power switch controlled by an operator. Of course, in other embodiments the energize signal can originate from the second battery 120 or from a power source distinct from the first and second batteries 118, 120. In some applications alternator operation is self-energized and the energize signal is generated after the alternator shaft begins turning. In such cases this signal is internal to the alternator and the regulator 106, and no external signal is supplied.

GG (Field-Pos) represents the side of the field winding 108 that is initially supplied with power by the energize signal. In FIGS. 4 and 5 GG is illustrated as a pin on the regulator 106. In other embodiments, the regulator 106 does not have a pin GG and the field winding 108 is connected directly to the node of the energize signal (at pin AA) externally to the regulator 106.

BB (Apos-in) represents the voltage of the first battery 118 as measured at this pin. This signal is also called $V_A$ voltage sense. In a presently preferred embodiment, the first battery 118 has a nominal value of 28 volts. This signal is identical to the energize signal, except that this signal is preferably connected directly to the first battery 118 with no intervening control switches.

CC (Aneg-in) represents the ground reference of the first battery 118. This signal is widely used throughout the regulator 106 as a ground reference for voltage measurements ($V_{SS}$ in FIG. 4). The voltage from the pin BB to the pin CC is the first battery 118 voltage $V_A$.

DD (Bpos-in) represents the voltage of the second battery 120 as measured at this pin. This signal is also called $V_B$ voltage sense. In a presently preferred embodiment, the second battery 120 has a nominal value of 84 volts.

EE (Bneg-in) represents the ground reference of the second battery 120. The voltage from the pin DD to the pin EE is the second battery 120 voltage $V_B$. This signal is preferably utilized in the $V_B$ regulation and voltage sense circuit 136 as one ground reference for the $V_B$ regulation. Preferably, this signal is electrically isolated from the signal $V_{SS}$ (Aneg-in) at pin CC. In a presently preferred embodiment, optoisolators or optocouplers are utilized to isolate the ground of voltage $V_B$ at pin EE from the ground of voltage $V_A$ ($V_{SS}$) and to interface the $V_B$ regulation and voltage sense circuit 136 with other circuits of the regulator 106. As is known to those skilled in the art, optoisolators couple electrical circuits without making direct wiring connections. Rather, a photodetector on one side of the device is responsive to light from a light source on the other side of the device. A typical limit on the isolation provided by an optoisolator is 1500 V peak (1060 V rms).

FF (Field-neg) represents the switched side of the field winding 108 that is controlled by the regulator 106 via the first control signal 162 and the field driver transistors circuit 130 to excite the field winding 108.

HH, II, JJ (Phase voltages A) represent the three AC phase voltages of the first stator windings 110. These signals are input to the first SCR control and AC voltage sense circuit 134. In some embodiments of the regulator 106, the AC phase voltages of the first stator windings 110 are utilized to infer the speed of the drive shaft of the alternator 100.

KK, LL, MM (Phase voltages B) represent the three AC phase voltages of the second stator windings 112. These signals are input to the second SCR control and AC voltage sense circuit 132. In some embodiments of the regulator 106, the AC phase voltages of the second stator windings 110 are utilized to infer the speed of the drive shaft of the alternator 100.

NN, OO, PP (Control/Trigger Signal to SCRs) represent the three control or trigger signals output from the first SCR control circuit 134 to the control or trigger inputs of respective SCRs 168, 170, 172. The control signals are controlled by the regulator 106 via the third control signal 166 and the first SCR control circuit 134 and are preferably electrically isolated from the control or trigger signals at pins QQ, RR, and SS.

QQ, RR, SS (Control/Trigger Signal to SCRs) represent the three control or trigger signals output from the second SCR control circuit 132 to the control or trigger inputs of respective SCRs 174, 176, 178. The control signals are controlled by the regulator 106 via the second control signal 164 and the first SCR control circuit 134 and are preferably electrically isolated from the control or trigger signals at pins NN, OO, and PP.

Figure 6:
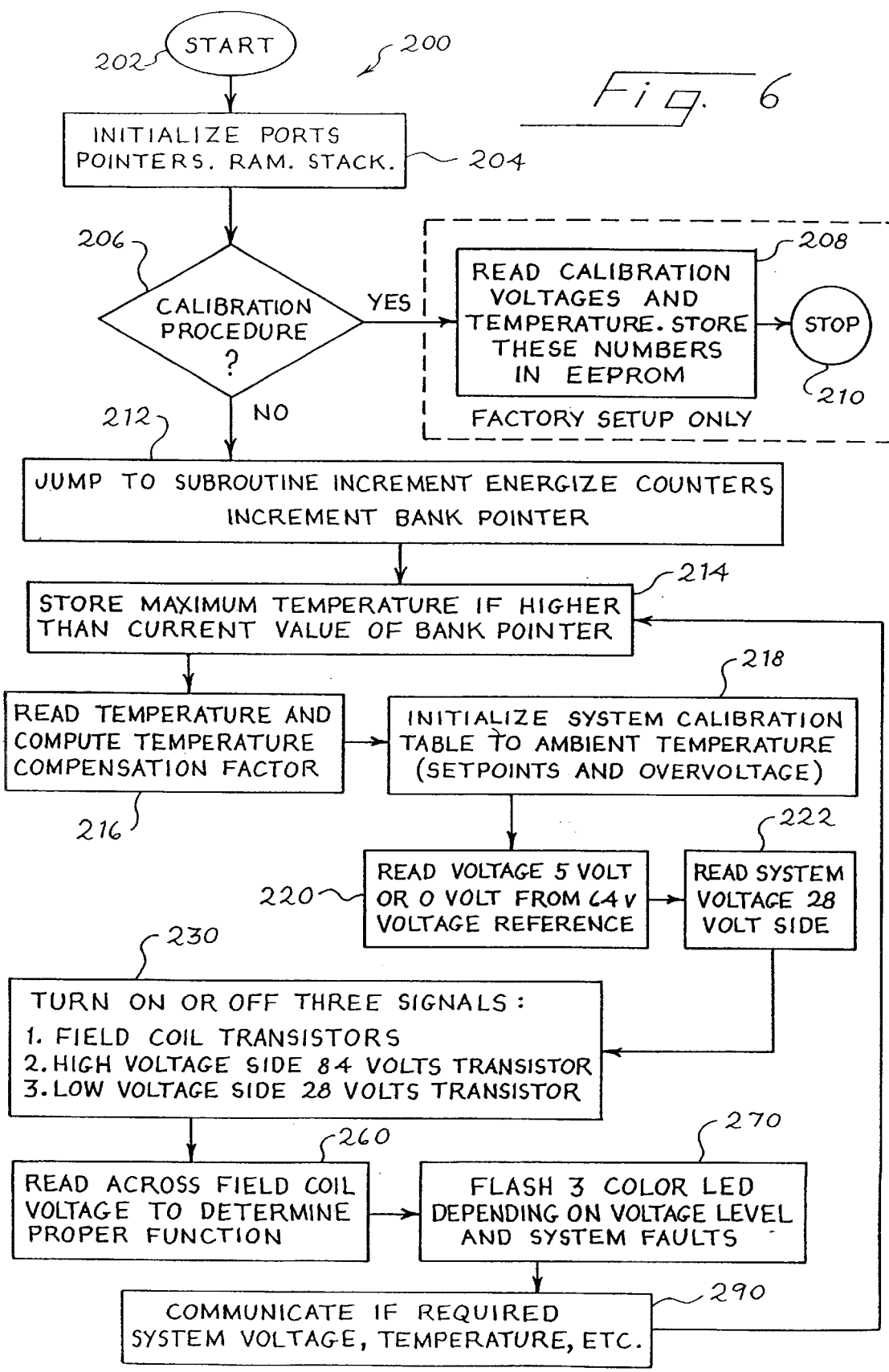
FIG. 6 is a flow chart of software routines executed by the micro-controller of FIG. 5.

Diagnostic LED circuit 144:

A tri-color, diagnostic, light emitting diode (LED) mounted on the regulator 106 and coupled to the micro-controller 160 receives commands from the micro-controller 160 that correspond to block 270 of the flow chart in FIG. 6. The operation of the diagnostic LED circuit 144 is explained in more detail below with reference to the FIG. 6.

Temperature Sense circuit 138:

This circuit 138 generates an analog voltage proportional to the ambient temperature as measured by a temperature sensor included for the sake of convenience within the regulator 106 enclosure. Any appropriate temperature responsive device may be mounted remotely if wiring is provided for the temperature signal. Other embodiments of the regulator 106 include temperature sensors for other parameters, such as stator winding temperature, field coil temperature, and bearing temperature.

Field Driver Transistors circuit 130:

The micro-controller 160 generates a first control signal 162 for the field driver transistors circuit 130 that controls the current flowing through the field winding 108 of FIG. 4. In a presently preferred embodiment, the first control signal 162 switches a buffer stage of MOSFETs that in turn switches a field stage of MOSFETs to control the current through the field winding 108 at pin FF. Of course, other implementations are possible and the field driver transistor circuit 130 is not limited to this preferred embodiment.

Voltage Supply $V_{DD}$ Regulation circuit 142:

The energize signal (preferably at $V_A$ volts) that is preferably responsive to the ignition switch (shown in FIG. 4) controlled by an operator enters the circuit 142 after buffering and generates a supply voltage $V_{DD}$ to power the micro-controller 160 and the regulator 106. Preferably, the supply voltage $V_{DD}$ is five (5) volts, but is not limited to this value. The value of $V_{DD}$ will in general depend on the supply voltage required by the micro-controller 160. In addition, the circuit 142 preferably provides a RESET input to the micro-controller 160 that acts as a safety signal to provide voltage to turn off the micro-controller 160.

First SCR Control and AC Voltage Sense circuit 134:

The micro-controller 160 generates a third control signal 166 for the first SCR control circuit 134 that controls the control or trigger signals to the SCRs 168, 170, 172 of the first rectifier circuit 114 of FIG. 4. In a presently preferred embodiment, this is accomplished by applying the third control signal 166 to the base of a bipolar junction transistor (BJT). As the BJT is turned on and off responsively to the third control signal 166, the BJT effectively toggles the control or trigger inputs of each of the three SCRs of the first rectifier circuit 114 of FIG. 4 via three respective optoisolators. The optoisolators serve to electrically isolate portions of the regulator 106 circuitry from the AC phase voltages and the output voltages and indirectly the output voltages $V_A$ and $V_B$ from one another.

Second SCR Control and AC Voltage Sense circuit 132:

The micro-controller 160 generates a second control signal 164 for the second SCR control 132 that controls the control or trigger signals to the SCRs 174, 176, 178 of the second rectifier circuit 116 of FIG. 4. In a presently preferred embodiment, this is accomplished by applying the second control signal 164 to the base of a bipolar junction transistor (BJT). As the BJT is turned on and off responsively to the second control signal 164, the BJT effectively toggles the control or trigger inputs of each of the three SCRs of the second rectifier circuit 116 of FIG. 4 via three respective optoisolators. The optoisolators serve to electrically isolate portions of the regulator 106 circuitry from the AC phase voltages and the output voltages and indirectly the output voltages $V_A$ and $V_B$ from one another.

$V_A$ Voltage Sense circuit 140:

During normal operation, the first battery 118 voltage $V_A$ appears as the $V_A$ voltage sense signal at pin BB, which is buffered by capacitors and resistors and a Zener diode at the $V_A$ voltage sense circuit 140 to protect the regulator 106 from high transient voltages. Depending on the result of a comparison of the $V_A$ voltage sense signal with the threshold voltage $V_{AREF}$, the micro-controller 160 provides the third control signal 166 to the first SCR control circuit 134.

$V_B$ Regulation and Voltage Sense circuit 136:

The $V_B$ regulation and voltage sense circuit 136 operates as a voltage sensor and monitor for the voltage $V_B$ that is separate from the micro-controller 160. Preferably, the micro-controller 160 does respond directly to value of the $V_B$ voltage, but instead responds to a proxy signal that serves as an indirect indication that the voltage $V_B$ exceeds or is below the threshold voltage $V_{BREF}$. In a presently preferred embodiment, optoisolators are used to isolate the circuit 136 from other circuits in the regulator 106, and provide electrical isolation of outputs $V_A$ and $V_B$. The energize signal turns on or enables the $V_B$ regulator circuit 136 via an optoisolator. A Zener diode is used as the voltage reference for the voltage $V_B$ and a comparator generates the proxy signal via another optoisolator. The micro-controller 160 reads the proxy signal which preferably has a value of either $V_{DD}$ (preferably five volts) or $V_{SS}$ (preferably zero volts). The proxy signal indicates whether the voltage $V_B$ read at pin DD and ground referenced to pin EE exceeds the threshold voltage $V_{BREF}$ that is internal to the $V_B$ regulation and voltage sense circuit 136. Of course, the proxy signal can be assigned other values, and other mechanisms can be utilized to read the voltage $V_B$ and compare the voltage $V_B$ to the reference or threshold voltage $V_{BREF}$ either directly or indirectly with respect to micro-controller 160.

The $V_B$ monitoring function of the $V_B$ regulation and voltage sense circuit 136 preferably includes a dead band. If the measured voltage $V_B$ is above some value X (85 volts and above, for example), then the proxy signal indicates to the micro-controller 160 that the voltage $V_B$ is high. If the measured voltage $V_B$ is below some value Y (83 volts and below, for example), then the proxy signal indicates to the micro-controller 160 that the voltage $V_B$ is low. These boundary values provide a desired hysteresis. Since the voltage $V_B$ may be relatively large (84 volts in a presently preferred embodiment), plus or minus one volt (for example) may not be an unacceptable amount for the regulated voltage $V_B$ to vary from the reference or threshold value $V_{BREF}$. Of course, it should be understood that these values are exemplary, and the dead band is not limited to these boundary values. The boundary values will generally vary from these exemplary values depending on what amount of variation in the regulated voltage $V_B$ is tolerated in a given application.

FIG. 6 is a flow chart 200 of the overall program software for the micro-controller micro-controller 160 (shown in FIG. 4) of the regulator 106 of FIGS. 4 and 5. The normal operating sequence begins with the appearance of the energize signal at pin AA of the regulator 106 (represented by block 202), which causes the initialization subroutine of block 204 to be executed. A calibration decision point in block 206 is active only during a factory setup calibration procedure, so in normal operation blocks 208 and 210 are not executed and the routine proceeds to block 212. In block 212, the energize counter maintains a count of the total number of times the regulator 106 has been energized. The bank pointer addresses an internal memory of the micro-controller 160 in block 214 that is used to store the maximum temperature measured by the regulator 106 during the respective energizing.

In block 216, the temperature is read from the temperature sense circuit 138 and a compensation factor is computed that is applied in block 218 as a temperature compensation to stored limits. Preferably, temperature compensation is applied to the reference voltage $V_{AREF}$. Another aspect of temperature compensation is to adjust for bias between the actual device temperature and the location at which the temperature transducer is located for those circumstances where direct measurement is not practical.

In the presently preferred embodiment, the voltage reference $V_{BREF}$ is not temperature compensated by the micro-controller 160 or by control logic, since the micro-controller 160 does not receive or monitor the value of the voltage reference $V_{BREF}$ directly. The $V_B$ regulation and voltage sense circuit 136 does provide some degree of negative temperature compensation arising from the use of a Zener diode, and temperature of the voltage reference can be controlled on a discrete component basis. Similarly, other components can be used or calibrations can be applied to adjust and compensate the voltage reference $V_{BREF}$ for temperature. In other embodiments, direct temperature compensation of the voltage reference $V_{BREF}$ occurs externally to the micro-controller 160. In other embodiments, both voltage references $V_{ABREF}$ and $V_{BREF}$ are read, monitored, or controlled directly by the micro-controller 160 and can thus be temperature compensated in a similar fashion.

In block 220, the proxy signal described above is read from the $V_B$ regulation and voltage sense circuit 136. The proxy signal indicates whether the voltage $V_B$ read between pin DD and ground reference pin EE exceeds the threshold voltage $V_{BREF}$ that is internal to the $V_B$ regulation and voltage sense circuit 136. Of course, the proxy signal can be assigned other values, and other mechanisms can be utilized to read the voltage $V_B$ and compare the voltage $V_B$ to the reference or threshold voltage $V_{BREF}$ either directly or indirectly with respect to micro-controller 160.

In block 222, the $V_A$ voltage sense input that appears at pin BB is read after buffering by the $V_A$ voltage sense circuit 140.

Next, a subroutine block 230 is executed to compare the voltage $V_A$ read in block 222 to the programmed, temperature-compensated voltage regulation setting $V_{AREF}$ and to process the proxy signal read in from the $V_B$ regulation and voltage sense circuit 136 in block 220, and to turn the following three signals on or off:

1. The first control signal 162 from the micro-controller 160 to the field driver transistors circuit 130 to control the field winding 108;
2. The second control signal 164 from the micro-controller 160 to the second SCR control circuit 132 to control the SCRs 174, 176, 178; and 3. The third control signal 166 from the micro-controller 160 to the first SCR control circuit 134 to control the SCRs 168, 170, 172.

The subroutine block 230 is described in more detail below with reference to FIG. 7.

In block 260, a handshake operation is performed to check the operation of the field winding 108 of FIG. 4. If the field winding 108 is on when it is supposed to be off, or vice versa, the information is presented to the diagnostic LED circuit 144 by the micro-controller 160.

Block 270 controls a tri-color, diagnostic, light emitting diode (LED) included in the diagnostic LED circuit 144. During normal operation the alternator 100 uses two signals to increase the respective voltage $V_B$ or $V_A$. The first control signal 162 will be sent to the field winding 108 and respective second or third control signal 164, 166 will be sent to the appropriate SCRs of the first and second rectifier circuits 114, 116. In the event of a fault such as a shorted field transistor or a shorted SCR, the respective voltage $V_A$ or $V_B$ may increase without control. For this reason the micro-controller 160 program preferably includes logic to protect the alternator 100 from over-voltage.

In a presently preferred embodiment, if the micro-controller 160 measures a steady high voltage at $V_A$ (for example 31 volts relative to a reference value of 28 volts) for more than 3 seconds, the micro-controller 160 will turn off the first, second, and third control signals 162, 164, 166 and maintain this logic state until the energize signal is recycled.

In a presently preferred embodiment, if the micro-controller 160 attempts to turn off the SCRs of the second rectifier circuit 116 by producing an off signal at the second control signal 164 for more than 3 seconds, the micro-controller 160 will turn off the first, second, and third control signals 162, 164, 166 and maintain this logic state until the energize signal is recycled.

The tri-color, diagnostic, LED analyzes the performance of the alternator 100 according to the following presently preferred indicator modes:

Blinking green: Both voltages $V_A$ and $V_B$ are at their respective regulated settings or thresholds and operation is under control.

Blinking Yellow: Either the voltage $V_A$ or the voltage $V_B$ is below its respective regulated setting or threshold. The alternator 100 is either not producing power or the circuit is overloaded.

Blinking Red: Either the voltage $V_A$ or the voltage $V_B$ is above its respective regulated setting or threshold. This situation may occur intermittently with high voltage transients or a system fault.

Steady Yellow: The alternator 100 is shut down and is not producing power at either voltage $V_A$ or $V_B$ due to persistent over-voltage detected at $V_A$ (the $V_A$ over-voltage protection described above). The regulator 106 will remain in this mode until the energize signal is recycled.

Steady Red: The alternator 100 is shut down and is not producing power at either voltage $V_A$ or $V_B$ due to persistent over-voltage detected at $V_B$ (the $V_B$ over-voltage protection described above). This may occur, for example, if the second battery 120 at $V_B$ is disconnected. The regulator 106 will remain in this mode until the energize signal is recycled.

Fast Blinking Yellow: In this mode, redundant control by the regulator 106 is lost. The alternator 100 should be serviced as soon as possible for fault in the system, the regulator 106 or in system wiring. The voltage $V_B$ will continue to be charged, but the voltage $V_A$ will default to a lower regulated voltage (such as 26 volts if $V_A$ is nominally 28 V) to alert an operator to a control malfunction. The regulator 106 will remain in this mode until the energize signal is recycled.

Fast Blinking Red: In this mode, control of the alternator 100 by the regulator 106 is lost, and the voltage $V_A$ or $V_B$ may rise uncontrollably. The output power leads of the alternator 100 should be disconnected immediately.

Block 290 applies when a communication port (not shown) is active to convey information from the alternator 100 to either a monitoring or systems control module. The communication port may send and receive status, or it may send and receive commands to change a parameter being monitored. Typical status information preferably includes output voltage, output current, shaft speed, temperature, efficiency, input power, and output power being produced as a percent of maximum rated output power at given shaft speed. An external controller can use this information to regulate shaft speed or to control applied electrical loads that affect the alternator power demand. Communication input signals can be used to change programmed limits. For example, shaft speed information can be used as part of a speed governor circuit in an auxiliary power unit that couples the alternator to a dedicated engine, and the governed speed will be dependent on the model alternator and type engine used. Programmed limits are tailored to specific alternator models. Regulated voltage settings are precisely set for each individual alternator during calibration.

Figure 7:
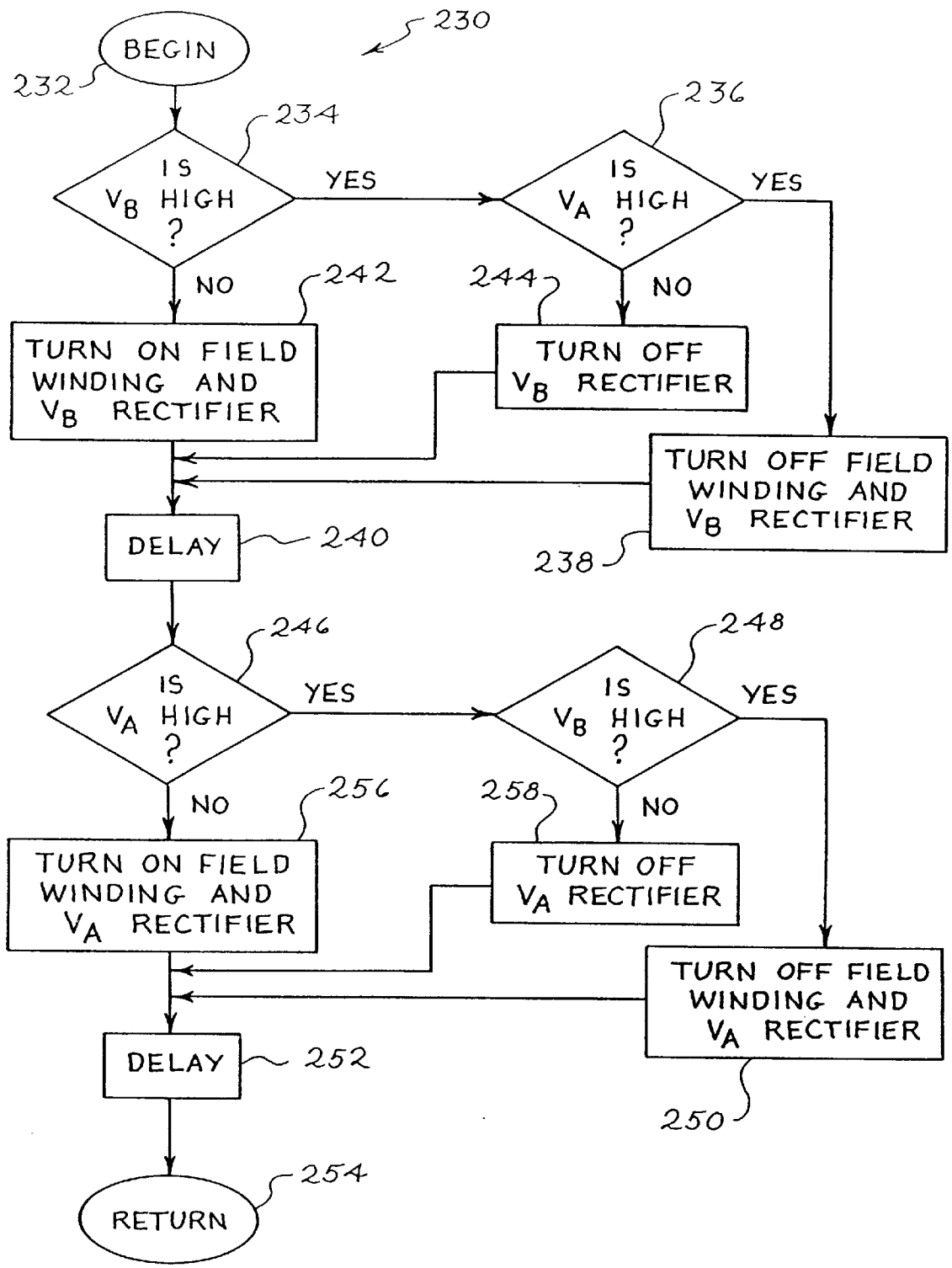
FIG. 7 is a flow chart of software routines expanding on a routine of FIG. 6.
Figure 8A:
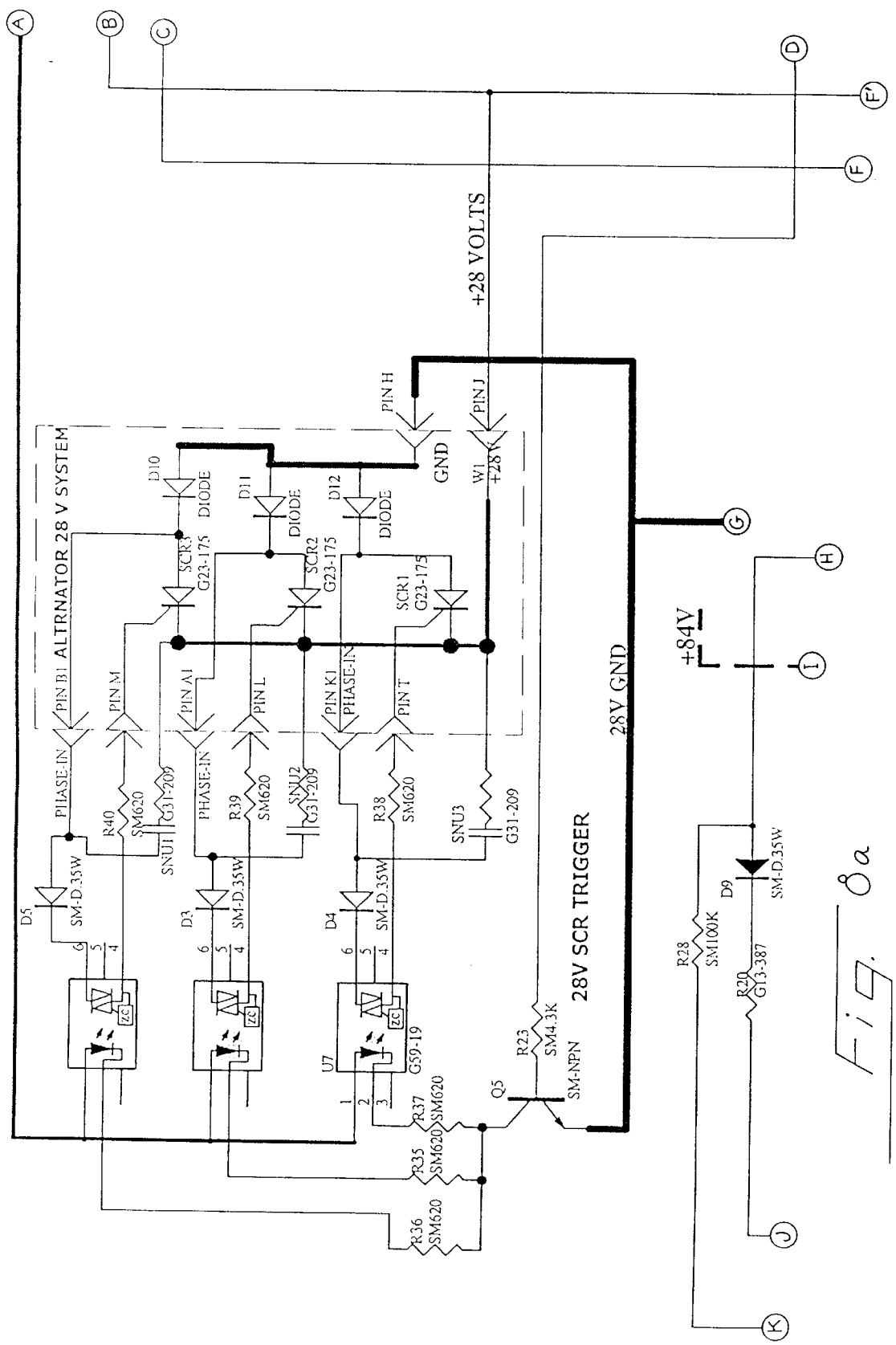
Figure 8C:
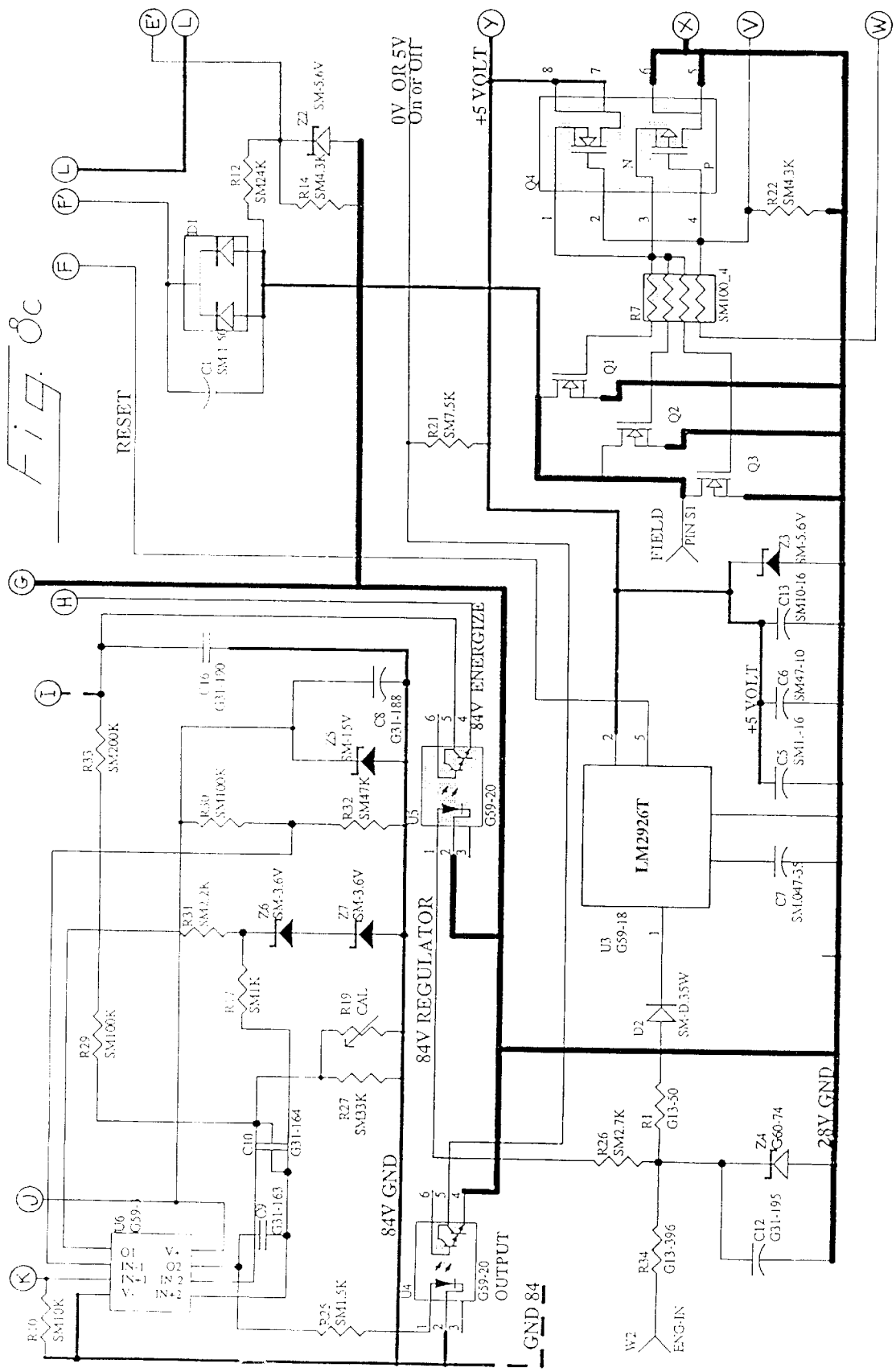
Figure 8D:
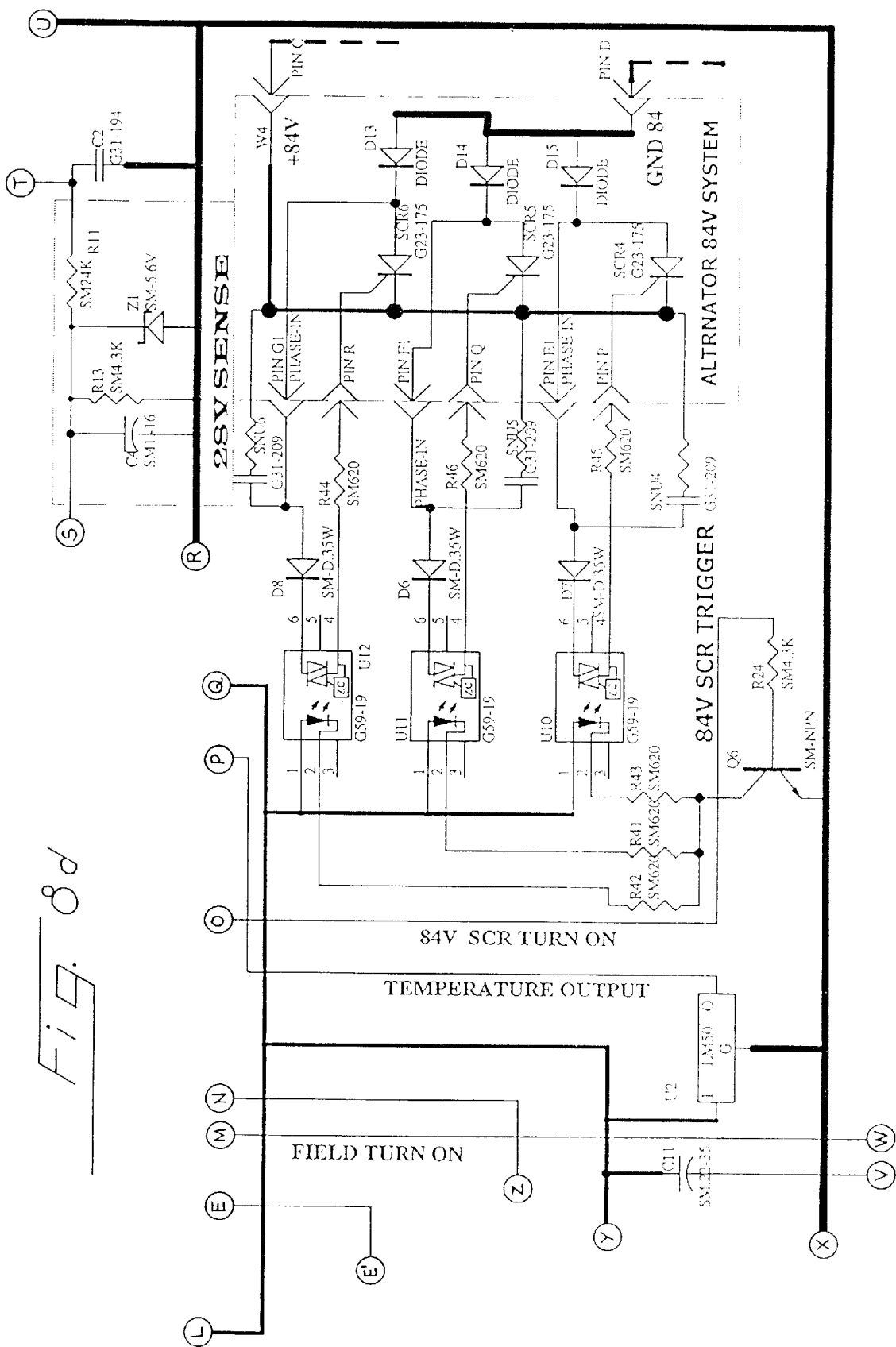

FIG. 7 describes in detail the operation of the subroutine performed in block 230 of FIG. 6. Block 232 represents the beginning of block 230. Block 234 is a decision point that determines whether the value of $V_B$ is high relative to the reference voltage $V_{BREF}$. If the voltage $V_B$ is high, block 236 is executed. Block 236 is a decision point that determines whether the value of $V_A$ is high relative to the reference voltage $V_{AREF}$. If the voltage $V_A$ is high, block 238 is executed. Block 238 is a command to turn off the field winding 108 and to turn off the SCRs 174, 176, 178 of the second rectifier circuit 116. Block 240 is a delay that follows execution of the command at block 238. In a presently preferred embodiment, the delay of block 240 is four milliseconds (ms) in length. Of course, the delay can be set at other values.

Returning to the decision point at block 236, if the voltage $V_B$ is high and the voltage $V_A$ is not high, block 244 is executed. Block 244 is a command to turn off the SCRs 174, 176, 178 of the second rectifier circuit 116. Block 240 is the delay that follows execution of the command at block 244.

Returning to the decision point at block 234, if the voltage $V_B$ is not high, block 242 is executed. Block 242 is a command to turn on the field winding 108 and to turn on the SCRs 174, 176, 178 of the second rectifier circuit 116. Block 240 is the delay that follows execution of the command at block 242.

Following the delay at block 240, block 246 is a decision point that determines whether the value of $V_A$ is high relative to the reference voltage $V_{AREF}$. If the voltage $V_A$ is high, block 248 is executed. Block 248 is a decision point that determines whether the value of $V_B$ is high relative to the reference voltage $V_{BREF}$. If the voltage $V_B$ is high, block 250 is executed. Block 250 is a command to turn off the field winding 108 and to turn off the SCRs 168, 170, 172 of the first rectifier circuit 114. Block 252 is a delay that follows execution of the command at block 250. In a presently preferred embodiment, the delay of block 252 is four milliseconds (ms) in length. Of course, the delay can be set at other values than this exemplary value. Although in this example, the delay of block 252 is equivalent to the delay of block 240, this need not be the case and the delay times can differ from each other as desired in other implementations of the subroutine performed in block 230.

Returning to the decision point at block 248, if the voltage $V_A$ is high and the voltage $V_B$ is not high, block 258 is executed. Block 258 is a command to turn off the SCRs 168, 170, 172 of the first rectifier circuit 114. Block 252 is the delay that follows execution of the command at block 258.

Returning to the decision point at block 246, if the voltage $V_A$ is not high, block 256 is executed. Block 256 is a command to turn on the field winding 108 and to turn on the SCRs 168, 170, 172 of the first rectifier circuit 114. Block 252 is the delay that follows execution of the command at block 256.

As described above, the field winding 108 is controlled with the first control signal 162 (from the micro-controller 160) that is input to the field driver transistors 130 block of FIG. 4. The SCRs 168, 170, 172 of the first rectifier circuit 114 are controlled with the third control signal 166 that is input to the first SCR control circuit 134 of FIG. 4. The SCRs 174, 176, 178 of the second rectifier circuit 116 are controlled with the second control signal 164 that is input to the second SCR control circuit 132 of FIG. 4.

The rationale behind the delay time in blocks 240 and 252 is to delay the actual switching of the field winding 108. With no delay, the subroutine block 230 would be executed quite fast and the entire flow chart loop would cycle very fast. The subroutine block 230 may execute in less than one millisecond, for example. This may result in a fast on-off switching of the field winding 108, which is undesirable because components such as the switched transistors of the field driver transistors circuit 130 of the regulator 106 may heat up and threaten performance of the regulator 106 and the field winding 108. More generally, some regulator 106 components would be unnecessarily overworked. Delaying the actual switching of the field winding 108 by inserting delays in the subroutine block 230 effectively delays the execution of the entire flow chart. Preferably, the delay times are selected so as to not affect regulator 106 control of the output voltages $V_A$ and $V_B$ and the field winding 108 while limiting overuse of the switching components of the regulator 106. Although any delay times can be used consistent with balancing these objectives, combined times for the delay blocks together of around six to twenty milliseconds (ms) have been found suitable. In the presently preferred embodiment, each delay block 240 and 252 has been assigned a delay time value of four milliseconds (ms). As an alternative, an interrupt driven system can be used instead of the disclosed delays.

Of course, it should be understood that the field winding 108 of FIG. 1 and FIG. 4 can be controlled in a variety of ways. The first control signal 162 of FIG. 4 generally turns the current through the field winding 108 on or off. However, in other embodiments the excitation of the field winding 108 current can be incrementally increased or decreased. In a presently preferred embodiment, the field winding 108 is controlled by the subroutine block 230 of FIGS. 6 and 7 and checked for proper operation in block 260. In this way, the field winding 108 can be changed each time the control loop of FIG. 6 is executed. In other embodiments, an interrupt driven system can be utilized to check the value of the current and thereupon introduce a command to control the current through the field winding 108. In another embodiment, the field winding 108 is turned on responsively to an ignition switch and remains on indefinitely.

It may be advantageous for other purposes to vary the field winding 108 current in a differing but complementary fashion to the procedure outlined in subroutine block 230. For example, a field winding 108 current having a prescribed duty cycle may be utilized in certain applications. In one embodiment, the field current is switched ON, OFF, or ON via the field driver transistors circuit 130 for a fixed interval depending upon the result of two separate comparisons that are used for regulation purposes:

1. a comparison of a current output voltage as it relates to a voltage regulation setting (as in the subroutine of block 230;
2. a comparison of the current output current as it relates to a programmed current limit. An average field switching circuit (not shown in FIG. 5 can be included in the regulator 106 to produce a voltage proportional to the time within a period that the field winding 108 is conducting current (e.g. duty cycle).

A presently preferred method for regulating the alternator 100 includes the following:

The regulator 106 increases the current through the field source 108 when either one of the first and second output voltages $V_A$, $V_B$ falls below the respective threshold $V_{AREF}$, $V_{BREF}$.

The regulator 106 decreases the current through the field source 108 when (1) the first output voltage $V_A$ exceeds the first threshold $V_{AREF}$ and (2) the second output voltage $V_B$ exceeds the second threshold $V_{BREF}$. That is, when both of the first and second output voltages $V_A$, $V_B$ exceed the respective threshold $V_{AREF}$, $V_{BREF}$, the regulator 106 decreases the current through the field source 108.

The regulator 106 controls the first rectifier circuit 114 to conduct current between the first power generating winding 110 and the first output 126 when the first output voltage $V_A$ falls below the first threshold $V_{AREF}$.

The regulator 106 controls the second rectifier circuit 116 to conduct current between the second power generating winding 112 and the second output 128 when the second output voltage $V_B$ falls below the second threshold $V_{BREF}$.

The regulator 106 interrupts the current between the first power generating winding 110 and the first output 126 when the first output voltage $V_A$ exceeds the first threshold $V_{AREF}$.

The regulator 106 interrupts the current between the second power generating winding 112 and the second output 128 when the second output voltage $V_B$ exceeds the second threshold $V_{BREF}$.

The alternator 100 described above provides a number of important advantages. The regulator 106 controls power at multiple outputs by way of controlling a field source such as a field winding and by switched rectification at each output. Also, the alternator outputs and power generating windings are electrically independent and isolated from one another. The physical layout and the structural configuration of the elements of the alternator 100 such as the stator windings, the field winding, and the rotors relative to each other and to the drive shaft have implications as well. For example, axially separate and electrically isolated stator windings that do not share a common ground can be individually optimized for power at various operating speeds and voltages while reducing undesirable coupling effects. It should be understood that any function or structure described above, as well as any advantages provided by any function or structure described above, can be utilized, practiced, or implemented separately in a wide variety of embodiments. For example, the regulation methods and functions can control outputs or elements such as windings that are not electrically isolated, that share a common ground, or are not independent of each other at all times. As another example, a permanent magnet can be utilized as the field source 108 and can be turned on at all times during normal operation. The output voltages can be regulated without regular switching on or off of the permanent magnet, but rather by controlling only switched rectifiers.

Application Ser. No. 09/338,320, filed Jun. 22, 1999 and herein incorporated by reference, describes an embodiment of a single voltage alternator regulator that controls both output voltage and output current, limits input drive power and torque, and maintains output power within a prescribed range while operating over a wide ambient temperature range and shaft speed range. Voltage, shaft speed and temperature signals are monitored, and the results are processed to determine the output current and to control the output power without exceeding the programmed limits for output voltage, output current, temperature, output power, drive power, torque, and shaft speed. The embodiment provides a predictable output power characteristic for the alternator, and it eliminates high input drive power and torque excursions that occur at low temperature and certain shaft speeds. If programmed limits are exceeded over a specified interval, and the alternator does not respond to the control changes imposed by the regulator, the regulator will turn off the alternator's field current, activate an alarm circuit, and set a fault code. The regulator is also capable of communicating with other control systems to provide status, specify needs, and respond to requests.

In other embodiments, the regulator can also store programmed limits for temperature, output power, efficiency, percent of rated output capacity, and shaft speed. Such variations can include controllers for controlling the alternator field current to maintain alternator operation within these program limits for one or more of these additional parameters, either alone or in combination with the parameters used to regulate field current in the preferred embodiment described in the Application Ser. No. 09/338,320.

The regulator 106 can include a generalized extension of the single voltage alternator regulator embodiments of the Application Ser. No. 09/338,320, filed Jun. 22, 1999 and can perform the functions listed above, including controlling both output voltages and currents, limiting input drive power and torque, and maintaining output power within a prescribed range while operating over a wide ambient temperature range and shaft speed range. In other embodiments, the regulator 106 is also capable of measuring and providing a signal indicative of the average field coil current by measuring the field winding duty cycle and by providing a voltage proportional to the field winding duty cycle.

An alternator according to this invention is described above. However, the embodiments are not limited to an alternator and can be applied to a variety of devices, for example an electrical generator. As used herein, the term generator (or electrical generator) is intended broadly to encompass the widest range of devices for generating electrical current when a generator shaft is rotated, including devices such as alternators. Thus, the term generator encompasses generating devices in which one of the field source and the first and second power generating windings is mounted to rotate with the generator shaft, and rotation of the shaft therefore modifies the electromagnetic interaction between the field source and the power generating windings. The term generator also encompasses devices in which both the field source and the power generating windings are mounted separately from the generator shaft, and the generator shaft rotates an element that modifies the electromagnetic interaction between the field source and the power generating windings.

As used herein, the term output is intended broadly to refer to a pair of conductors or output terminals, or to a conductor that is coupled with an output terminal, with or without intervening electrical components. The pair of conductors can include a pair of output terminals, for example. In addition, a conductor can be any output of the alternator 100 (e.g. an output terminal or a pair of output terminals).

As used herein, the term alternator is intended broadly to encompass embodiments that may or may not incorporate a regulator. The regulator may be mounted separately from the alternator, or may be incorporated within the alternator, for example. In a preferred embodiment of the alternator 100, the regulator is mounted separately from the alternator 100. However, in other embodiments the regulator is incorporated within the alternator 100.

Although two voltages $V_A$ and $V_B$ are illustrated in FIGS. 1 and 4, in other embodiments the alternator 100 can supply output power to more than two electrical systems operating at respective voltages. Preferably, these electrical systems are electrically isolated from one another and the respective operating voltages do not share common grounds with each other.

Preferably, the first electrical system 102 includes a first battery, with a nominal value of $V_A$. Preferably, the second electrical system 104 includes a second battery, with a nominal value of $V_B$. Supplying output power to the first electrical system 102 preferably includes charging the first battery. Supplying output power to the second electrical system 104 preferably includes charging the second battery. In another embodiment, the first and second electrical systems 102, 104 include only the first and second batteries, respectively, and the first and second electrical systems 102, 104 in turn supply voltage to other, external electrical systems.

Preferably, the first electrical system 102 includes one or more loads that receive power from the first battery. Preferably, the electrical system 104 includes one or more loads that receive power from the second battery. The loads may be connected or disconnected to the respective battery as power is needed.

A reference or threshold voltage such as $V_{AREF}$ or $V_{BREF}$ can be set at a fixed value, or the threshold can be varied during operation. The threshold may be compensated to account for operating conditions, including temperature. In general, a threshold is said to be crossed when the magnitude of the voltage exceeds the magnitude of the threshold or vice versa. The threshold can be crossed in either direction, either from below or from above the threshold. In some embodiments, crossing the threshold involves hysteresis, so that the threshold is crossed from below and from above at different values. A threshold is exceeded when the absolute magnitude of the threshold is exceeded. For example, a value of −13 volts exceeds a −12 volt threshold. Similarly, and in this context only, a value is high when it exceeds a threshold in absolute magnitude, and a value is low when it falls below a threshold in absolute magnitude.

In a presently preferred embodiment, the first and second output voltages $V_A$ and $V_B$ are DC voltages. Of course, it should be understood that the alternator 100 is not limited to DC power output, and other embodiments provide an AC power output. In AC power output embodiments, triacs can be used in place of the first and second rectifier circuits 114, 116 to provide AC output current from the respective first and second power generating windings 110, 112.

A challenge in designing for one or more AC outputs is maintaining a stable output frequency. The speed of the drive shaft of an electrical generator such as an alternator will in general modulate the output frequency of an AC output. The generation of an AC output with a stable and reliable output frequency may be obtained with a fixed speed alternator.

It should be understood that while the use of SCRs in the first and second rectifier circuits 114, 116 is preferred, other elements can be used. The switched rectifier can include a metal oxide semiconductor field effect transistor (MOSFET), for example. Of course, more than one device can be used to perform the rectification, or to perform the switched rectification. In other embodiments the switched rectifier can be one element, or two or more elements utilized together as a switched rectifier. For example, a MOSFET and a diode can be utilized in series to perform a switched rectification function. More generally, a diode rectifier can be used in series with a switch, for example.

Either the negative side or the positive side of a switched rectifier can be coupled to an AC voltage output. For example, in FIG. 4, each one of the AC phase voltage outputs of the first and second stator windings 110, 112 is connected to an SCR on the positive side and to a diode on the negative side. Other implementations are possible, however, and the Alternator 100 is not limited to this preferred embodiment. In another embodiment, the situation is reversed, and each one of the AC phase voltage outputs is connected to an SCR on the negative side and to a diode on the positive side.

It should be understood that, as used herein, the term control signal refers broadly to an analog or a digital signal and encompasses both types of signals.

The Appendix that forms part of this application includes a computer listing and a schematic diagram for a presently preferred embodiment of this invention. This Appendix has been provided to ensure that one of ordinary skill in the art is able to make and use the best mode of this invention without undue experimentation, but is not intended to limit the scope of the claims. In the event of any inconsistency between the disclosure of the Appendix and the foregoing detailed description, it is the Appendix that is to control.

It should be understood that the steps of the methods recited herein can be performed in any order consistent with the recited acts.

The foregoing detailed description has described only a few of the many forms that this invention can take. This detailed description is therefore intended only by way of illustration, and not limitation. It is only the following claims, including all equivalents, that are intended to define the scope of this invention.

I claim:

1. A method for regulating an electrical generator comprising a field source and first and second power generating windings to supply current at first and second outputs, respectively, said method comprising:

(a) conducting current between the first power generating winding and the first output when the first output voltage falls below a first threshold;

(b) conducting current between the second power generating winding and the second output when the second output voltage falls below a second threshold; and (c) increasing current through the field source when either one of the first and second output voltages falls below the respective threshold.

2. The method of claim 1 wherein the first and second outputs each comprise a respective pair of conductors, wherein the first and second outputs are electrically isolated from one another, and wherein (a) and (b) comprise conducting DC currents between the respective power generating winding and the respective output.

3. The method of claim 1 further comprising:

(d) decreasing current through the field source when (1) the first output voltage exceeds the first threshold and (2) the second output voltage exceeds the second threshold.

4. The method of claim 3 further comprising:

(e) interrupting current between the first power generating winding and the first output when the first output voltage exceeds the first threshold; and (f) interrupting current between the second power generating winding and the second output when the second output voltage exceeds the second threshold.

5. The method of claim 1 wherein the field source comprises a field winding.

6. A method for regulating an electrical generator comprising a field source and first and second power generating windings to supply current at first and second outputs, respectively, said method comprising:

(a) conducting current between the first power generating winding and the first output when the first output voltage falls below a first threshold;

(b) conducting current between the second power generating winding and the second output when the second output voltage falls below a second threshold; and (c) decreasing current through the field source when (1) the first output voltage exceeds the first threshold and (2) the second output voltage exceeds the second threshold.

7. The method of claim 6 wherein the first and second outputs each comprise a respective pair of conductors, wherein the first and second outputs are electrically isolated from one another, and wherein (a) and (b) comprise conducting DC currents between the respective power generating winding and the respective output.

8. The method of claim 6 further comprising:

(d) interrupting current between the first power generating winding and the first output when the first output voltage exceeds the first threshold; and (e) interrupting current between the second power generating winding and the second output when the second output voltage exceeds the second threshold.

9. The method of claim 6 wherein the field source comprises a field winding.

10. A multiple voltage electrical generator comprising:

a field source;

first and second power generating windings to supply current at respective first and second outputs;

a voltage regulator comprising:

first means for conducting current between the first power generating winding and the first output when the first output voltage falls below a first threshold;

second means for conducting current between the second power generating winding and the second output when the second output voltage falls below a second threshold; and means for increasing current through the field source when either one of the first and second output voltages falls below the respective threshold and for decreasing current through the field source when both of the first and second output voltages exceed the respective threshold.

11. The invention of claim 10 wherein the field source comprises a field winding.

* * * * *